US010548156B2

(12) United States Patent
Luo et al.

(10) Patent No.: US 10,548,156 B2
(45) Date of Patent: Jan. 28, 2020

(54) RESOURCE INDICATION PROCESSING METHOD AND PROCESSING APPARATUS, ACCESS POINT, AND STATION

(71) Applicant: Huawei Technologies Co., Ltd., Shenzhen (CN)

(72) Inventors: Jun Luo, Shanghai (CN); Yingpei Lin, Shanghai (CN); Jiayin Zhang, Kanata (CA); Xun Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/387,265

(22) Filed: Dec. 21, 2016

(65) Prior Publication Data

US 2017/0105229 A1   Apr. 13, 2017

Related U.S. Application Data

(63) Continuation of application No. PCT/CN2014/082437, filed on Jul. 17, 2014.

(30) Foreign Application Priority Data

Jun. 27, 2014   (WO) ................ PCT/CN2014/080976
Jul. 16, 2014   (WO) ................ PCT/CN2014/082343

(51) Int. Cl.
*H04W 72/12*   (2009.01)
*H04W 72/04*   (2009.01)
(Continued)

(52) U.S. Cl.
CPC ....... *H04W 72/121* (2013.01); *H04W 72/042* (2013.01); *H04W 72/0446* (2013.01); *H04L 27/26* (2013.01); *H04W 84/12* (2013.01)

(58) Field of Classification Search
CPC .......... H04W 72/121; H04W 72/0446; H04W 72/042
See application file for complete search history.

(56) References Cited

U.S. PATENT DOCUMENTS 8,000,272 B2 * 8/2011 Gao .................... H04W 72/14
370/280
9,191,084 B2   11/2015 Bao et al.
(Continued)

FOREIGN PATENT DOCUMENTS

CN   1741636 A   3/2006
CN   1930799 A   3/2007
(Continued)

OTHER PUBLICATIONS

"Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput Operation in Bands below GHz," IEEE P802.11ac/D7.0, Institute of Electrical and Electronic Engineers (Sep. 2013).
(Continued)

*Primary Examiner* — Rasheed Gidado
(74) *Attorney, Agent, or Firm* — Leydig, Voit & Mayer, Ltd.

(57) ABSTRACT

A resource indication processing method, which is applied to a wireless local area network that uses an OFDMA technology, where the method includes sending or receiving a frame including a resource indication field, where the resource indication field includes an identifier of a user, and resource block information and modulation and coding scheme MCS information that are corresponding to the identifier of the user.

17 Claims, 23 Drawing Sheets

(51) Int. Cl.
*H04L 27/26* (2006.01)
*H04W 84/12* (2009.01)

(56) References Cited

U.S. PATENT DOCUMENTS

| | | | | |
|---|---|---|---|---|
| 9,473,269 | B2* | 10/2016 | Walton | H04B 7/2643 |
| 2005/0201269 | A1 | 9/2005 | Shim et al. | |
| 2005/0232181 | A1 | 10/2005 | Park et al. | |
| 2007/0253367 | A1 | 11/2007 | Dang et al. | |
| 2009/0316815 | A1 | 12/2009 | Glazko et al. | |
| 2010/0142466 | A1* | 6/2010 | Palanki | H04J 11/0053 370/329 |
| 2011/0164695 | A1* | 7/2011 | Zheng | H04B 7/086 375/260 |
| 2011/0243017 | A1* | 10/2011 | Prasad | H04W 72/085 370/252 |
| 2013/0229996 | A1 | 9/2013 | Wang et al. | |
| 2014/0044069 | A1* | 2/2014 | Bao | H04B 7/0417 370/329 |
| 2014/0177564 | A1* | 6/2014 | Ma | H04W 74/04 370/329 |
| 2014/0286257 | A1* | 9/2014 | Kim | H04W 72/1278 370/329 |
| 2016/0021682 | A1* | 1/2016 | Wang | H04W 74/04 370/329 |
| 2016/0073429 | A1* | 3/2016 | Oteri | H04W 74/0816 370/338 |
| 2016/0278081 | A1* | 9/2016 | Chun | H04W 74/08 |
| 2017/0005709 | A1* | 1/2017 | Li | H04B 7/0452 |
| 2017/0086212 | A1* | 3/2017 | Kim | H04W 72/04 |

FOREIGN PATENT DOCUMENTS

| | | |
|---|---|---|
| CN | 1930804 A | 3/2007 |
| CN | 101820669 A | 9/2010 |
| CN | 101964943 A | 2/2011 |
| CN | 102013959 A | 4/2011 |
| CN | 102067506 A | 5/2011 |
| CN | 102100090 A | 6/2011 |
| CN | 102447539 A | 5/2012 |
| WO | WO 2010110619 A2 | 9/2010 |
| WO | 2015064943 A1 | 5/2015 |

OTHER PUBLICATIONS

"Draft Standard for Information Technology—Telecommunications and information exchange between systems Local and Metropolitan area networks—Specific requirements, Part 11: Wireless LAN Medium Access Control (MAC) and Physical Layer (PHY) Specifications; Amendment 6: Enhancements for High Efficiency WLAN," IEEE P802.11ax/D1.2, Institute of Electrical and Electronic Engineer (Apr. 2017).
Nguyen et al.,"Uplink multi-user MAC protocol for 11ax",IEEE 802.11-14/0598r0,Kyushu Institute of Technology, Institute of Electrical and Electronics Engineers, New York, New York (May 11, 2014).
Chun et al., "Legacy Support on HEW frame structure," IEEE 802.11-13/1057r0, pp. 1-8, Institute of Electrical and Electronics Engineers, New York, New York (Sep. 2013).
Fang et al., "802.11 TGax PHY Frame Structure Discussion for Enabling New Contention Mechanism," IEEE 802.11-14/1168r1, pp. 1-18, Institute of Electrical and Electronics Engineers, New York, New York (Sep. 2014).
CN 201480080152.5, Office Action, dated Jul. 31, 2019.

* cited by examiner

| Zone 1 | Zone 2 |
|--------|--------|
| Zone 3 | Zone 4 |

FIG. 8

| MAP type | RB assignment | MCS index | New Data indication | HARQ process number | Redundancy version | TPC | SID/GID |
|----------|---------------|-----------|---------------------|---------------------|--------------------|-----|---------|
| 000 | 22/15bit | 6 bit | 1 bit | 4 bit | 2 bit | 2 bit | 12bit |

FIG. 9A

| MAP type | RB assignment | MCS index | New Data indication | HARQ process number | Redundancy version | Transmission format info | TPC | SID/GID |
|---|---|---|---|---|---|---|---|---|
| 001 | 22/15 bit | 6 bit | 1 bit | 4 bit | 2 bit | 1 bit | 2 bit | 12 bit |

FIG. 9B

| MAP type | SF number | RB assignment | MCS index | New Data indication | HARQ process number | Redundancy version | TPC | Transmission format info | SID/ GID |
|---|---|---|---|---|---|---|---|---|---|
| 011 | 2 bit | 12 bit | 6 bit | 1 bit | 4 bit | 2 bit | 2 bit | 6 bit | 12 bit |

FIG. 9C

RESOURCE INDICATION PROCESSING METHOD AND PROCESSING APPARATUS, ACCESS POINT, AND STATION

CROSS-REFERENCE TO RELATED APPLICATIONS

This application is a continuation of International Application No. PCT/CN2014/082437, filed on Jul. 17, 2014, which claims priority to International Application No. PCT/CN2014/082343, filed on Jul. 16, 2014, and International Application No. PCT/CN2014/080976, filed on Jun. 27, 2014. All of the aforementioned patent applications are hereby incorporated by reference in their entireties.

TECHNICAL FIELD

The present invention relates to the field of wireless communications technologies, and more specifically, to a method for transmitting information, an access point, and a station.

BACKGROUND

With development of the mobile Internet and popularization of an intelligent terminal, data traffic increases rapidly. A wireless local area network (WLAN) becomes one of mainstream mobile broadband access technologies due to advantages of a high rate and a low cost.

To greatly improve a service transmission rate of a WLAN system, a next-generation 802.11ax standard released by the Institute of Electrical and Electronics Engineers (IEEE) further uses an orthogonal frequency division multiple access (OFDMA) technology on a basis of an existing orthogonal frequency division multiplexing (OFDM) technology. With the OFDMA technology, an air interface wireless channel time-frequency resource is divided into multiple orthogonal time-frequency resource blocks (RB). RBs are sharable in time and orthogonal in a frequency domain.

The OFDMA technology supports multiple nodes to simultaneously send and receive data. When data needs to be transmitted between an access point and a station, resources are assigned based on an RB or an RB group; different channel resources are assigned to different STAs at the same time, so that multiple STAs are efficiently connected to a channel, and channel utilization is improved. For a WLAN system based on the OFDMA, a time-frequency resource needs to be efficiently indicated to the STA.

SUMMARY

Embodiments of the present invention provide a method for transmitting information, an access point, and a station, so that a time-frequency resource may be efficiently indicated to a station.

According to one aspect, A resource indication method in a wireless local area network, comprising: generating, by an access point AP in the wireless local area network, scheduling information of at least two STAs, wherein the scheduling information comprises at least uplink control information used to instruct the at least two STAs to send uplink data; and sending, by the AP and respectively on different sub-channels in a specified entire channel, scheduling information corresponding to different STAs.

According to another aspect, A data sending method in a wireless local area network, comprising: receiving, by a station STA, scheduling information sent by an AP on a sub-channel, wherein the scheduling information comprises at least uplink control information used to instruct the STA and at least one another STA to send uplink data; and sending, by the STA, the uplink data according to the uplink control information.

Correspondingly, an access point is further provided, where the access point includes the foregoing resource indication processing apparatus, and a processor in the resource indication processing apparatus is specifically configured to send the frame including the resource indication field.

Correspondingly, a station is further provided, where the station includes the foregoing resource indication processing apparatus, and a processor in the resource indication processing apparatus is specifically configured to receive the frame including the resource indication field.

By using the foregoing indication manners, a time-frequency resource is efficiently indicated to a station, and the station may use an indicated resource to perform communication.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 8 is a schematic diagram of zone division of resource indication according to another embodiment of the present invention;

FIG. 9A-9C are respectively schematic diagrams of resource indication types according to an embodiment of the present invention;

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

An access point (AP, Access Point), which may also be referred to as an access point of wireless access, a bridge, a hotspot, or the like, and may be connected to a server or a communications network.

A station (STA, Station), which may further be referred to as a user, may be a wireless sensor, a wireless communications terminal, or a mobile terminal, such as a mobile phone (also referred to as a "cellular" phone) that supports a WiFi communication function or a computer that has a wireless communication function. For example, a station may be a portable, pocket-sized, handheld, computer-built-in, wearable, or vehicle-mounted wireless communications apparatus that supports the WiFi communication function, which exchange communication data, such as voice and data, with a radio access network.

Figure 1A:
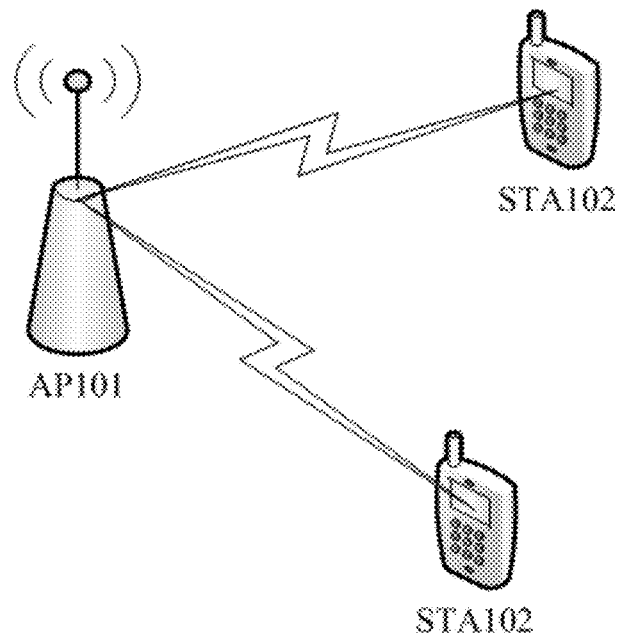
FIG. 1A is a schematic diagram of an applicable system architecture according to an embodiment of the present invention.

FIG. 1A is a simple schematic diagram of a WLAN system applied in an implementation manner of the present invention. The system in FIG. 1A includes one or more access points AP101 and one or more stations STA102. Wireless communication is performed between the access point 101 and the station 102 by using an OFDMA technology, where a data frame sent by the access point 101 includes indication information of a time-frequency resource for the station 102.

Figure 1B:
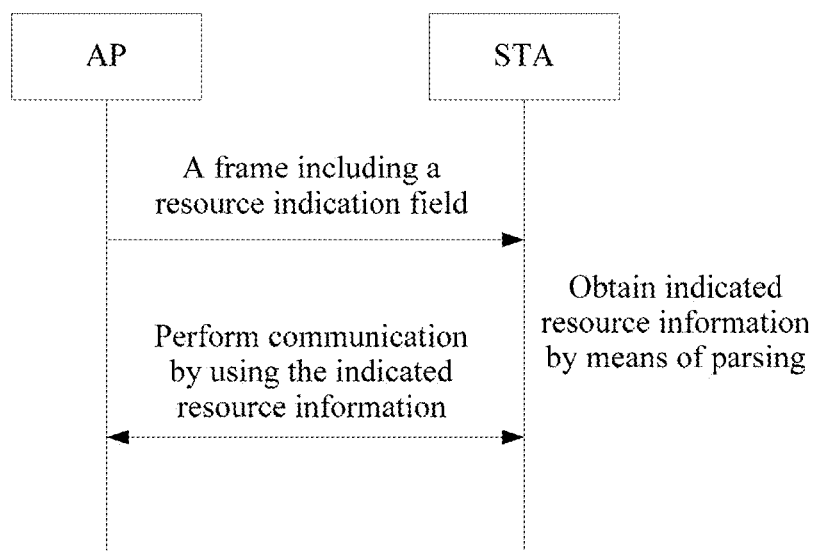
FIG. 1B is a schematic diagram of an applicable process according to an embodiment of the present invention.

Specifically, referring to FIG. 1B, an implementation manner of the present invention provides a resource indication method, which is applied to a wireless local area network that uses the OFDMA technology. An access point sends a frame including a resource indication field to a station, where the resource indication field includes an identifier of a user, and resource block information and modulation and coding scheme information that are corresponding to the identifier of the user. Correspondingly, after receiving the frame including the resource indication field, the station parses the resource indication field to obtain information about a resource block assigned to the station, modulation and coding scheme information, and information about a number of spatial streams, and performs communication by using the resource block information, the modulation and coding scheme information, and the information about a number of spatial streams. It may be seen from the foregoing method that in resource indication, the resource indication is performed based on a user. Certainly, the resource herein is a time-frequency resource in a wireless local area network, and in particular, an unlicensed time-frequency resource.

Specifically, the STA obtains the resource block information, and subsequently performs communication by using a corresponding resource block; the STA obtains the MCS information, that is, a corresponding modulation and coding scheme for data sending and receiving, and subsequently sends and receives data by using the MCS; the STA acquires the information about the number of spatial streams, and may use a corresponding quantity of spatial streams to transmit data when sending the data; after acquiring TPC information, the STA may transmit the data in an adjusted sending power when sending the data.

The following describes in detail several frames used for resource indication in the foregoing communications system. Based on these frames, the foregoing method for indicating resource information to the station is further implemented. Specifically, an implementation process of the method is: The access point sends frames described below to the station; after receiving these frames, the station obtains, by means of parsing, resources for self-use, and subsequently uses these resources to perform communication.

Figure 2:
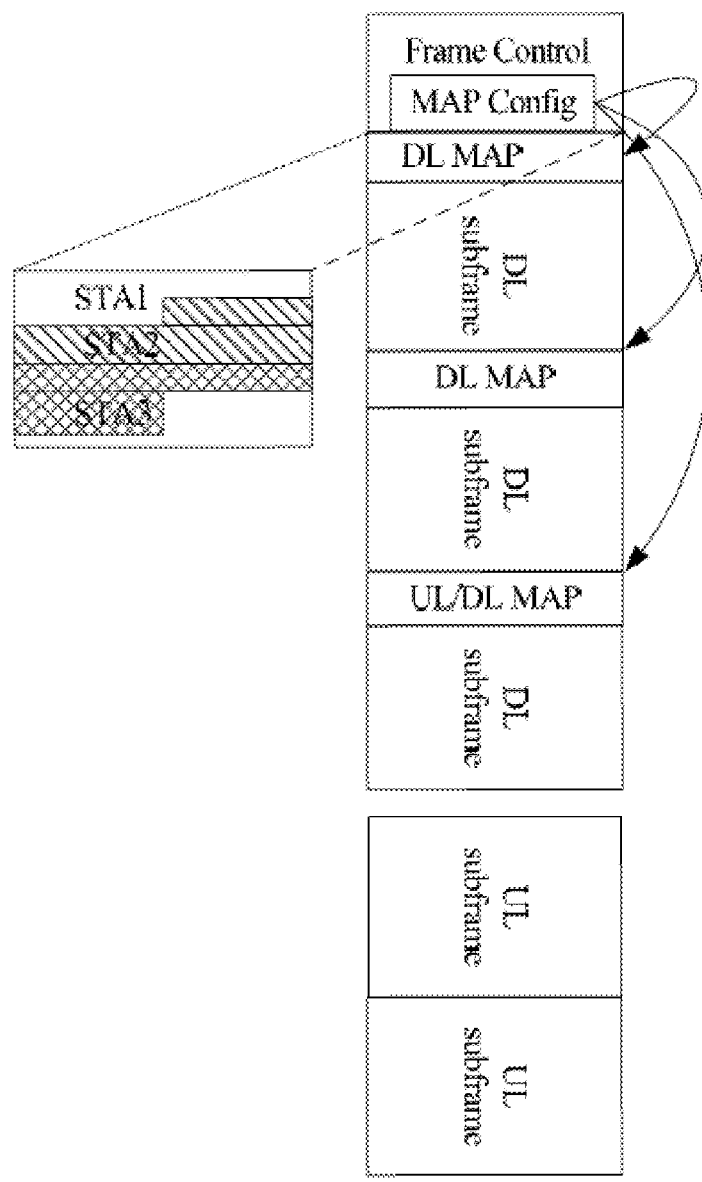
FIG. 2 is a schematic diagram of a frame used for resource indication according to an embodiment of the present invention.

Referring to FIG. 2, an implementation manner of the present invention provides a frame that is applied to a wireless local area network and that is used for resource indication. As shown in FIG. 2, a data frame includes a control field (for example, referred to as Frame control or SIG-A), where the control field includes configuration information (for example, referred to as MAP Config) of "resource indication"; the data frame further includes a "resource indication" field (such as a DL MAP, a UL MAP, a UL\DL MAP, or a SIG-B field in FIG. 2), where the "resource indication" field includes a resource indication of a time-frequency resource for one or more stations 102.

Figure 3:
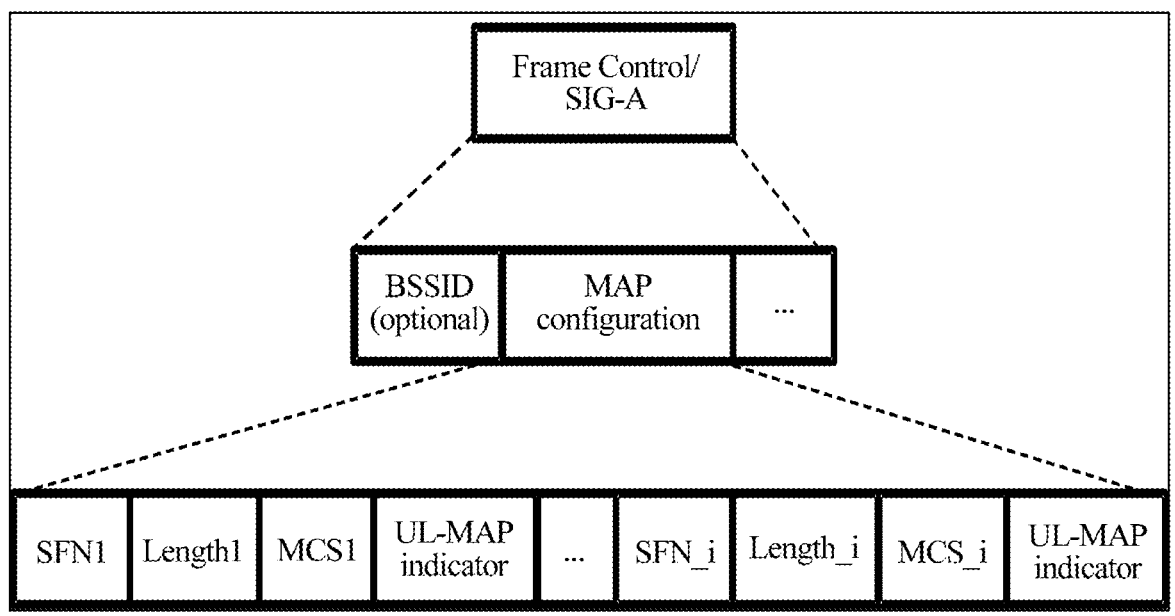
FIG. 3 is a schematic diagram of a frame used for resource indication according to an embodiment of the present invention.

Referring to FIG. 3, in a specific example, in the foregoing frame, optionally, the control field may further include BSSID information of an access point 101. The configuration information of the "resource indication" may include "resource indication" configuration information of multiple uplink and downlink subframes (UL/DL subframe). The configuration information of the "resource indication" may include a position of a time-frequency resource of the "resource indication", a length of the "resource indication", a modulation and coding scheme (Modulation and Coding Scheme, MCS) of the "resource indication", or the like. Specifically, the position of the time-frequency resource of the "resource indication" may include a frame number (such as an SFN1 in FIG. 3) in which the resource indication field is located. Optionally, the configuration information of the "resource indication" may further include information such as an uplink "resource indication" (UL MAP indicator) or bandwidth, where the UL MAP indicator is used to describe that the resource indication field indicates an uplink user, and the bandwidth is used to notify a STA of bandwidth information of an AP.

It should be noted that, referring to FIG. 3, in the configuration information of the "resource indication" of the foregoing frame, relative positions of "resource indication" of the uplink and downlink subframes in the control field do not need to be differentiated. In other words, neither some fixed positions of "resource indication" of an uplink subframe nor some fixed positions that are in the control field and that are of "resource indication" of a downlink subframe are required. Because a position of the resource indication field does not need to be indicated, overhead of the control field may be reduced.

It should be noted that a structure that is given in the foregoing FIG. 2 to FIG. 3 and that is of the control field+the "resource indication" field may also be replaced by another possible frame, such as a frame that does not include a control field but includes only a "resource indication" field.

Referring to FIG. 2 to FIG. 8, FIG. 2 to FIG. 8 also show simple schematic diagrams of multiple "resource indication" fields. It should be noted that resource indication fields in the foregoing various frames may perform indication based on a time-frequency resource, that is, indicating which STA or which STAs (not shown in the figure) can use the time-frequency resource. Specifically, in a system, a time-frequency resource that may be used by a user is divided into several time-frequency resource blocks, where each time-frequency resource block is assigned to or matched with a user identifier ID (including a Group ID of MU-MIMO users) and a corresponding modulation and coding scheme MCS; or the resource indication fields may perform indication based on a user, that is, indicating which time-frequency resources may be used by one or more users (that is, the STA) (for example, manners shown in FIG. 5 to FIG. 8).

Preferably, in the "resource indication" field, the uplink resource indicator (UL MAP) may be placed near a downlink subframe of the uplink subframe. As shown in FIG. 2, the UL\DL MAP is located in a closest DL SUBFRAIVIE preceding a UL SUBFRAIVIE. In this way, MAP information (indicating a time-frequency resource used by a user) obtained by the AP according to scheduling of a STA channel is more timely and suitable for a subsequent uplink subframe of the STA. In other words, uplink resource information is more reliable, and decoding complexity may be further reduced.

Figure 4:
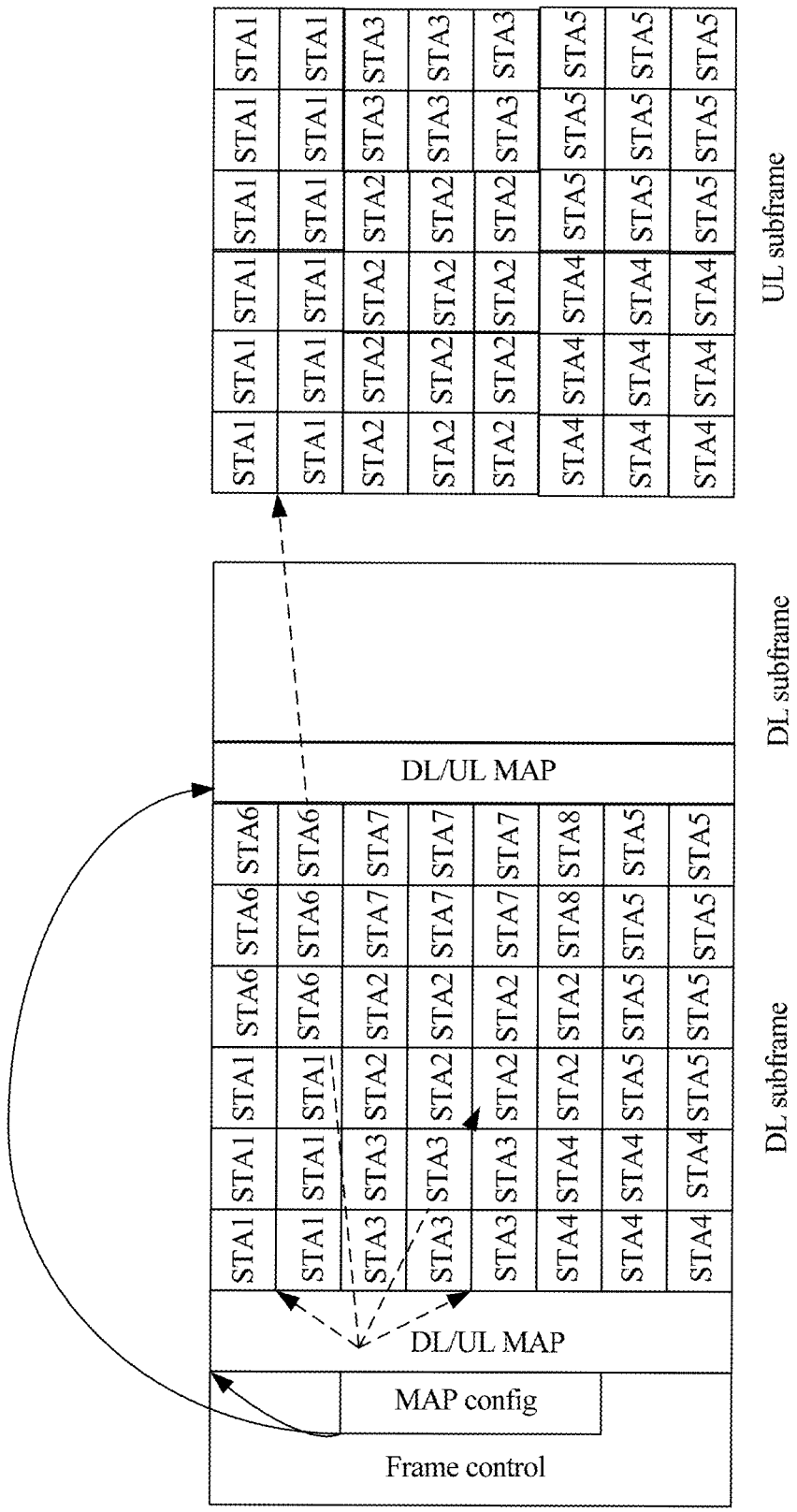
FIG. 4 is a schematic diagram of a frame used for resource indication according to an embodiment of the present invention.

As shown in FIG. 4, in positions of sometime-frequency resources of each downlink subframe (such as first several OFDM symbols of each subframe), resource indication fields of all STAs of a current subframe are included or carried, such as a downlink resource indicator DL MAP, or an uplink/downlink resource indicator UL/DL MAP. UL MAP information and DL MAP information may be combined into DL/UL MAP information and perform indication in the downlink subframe. The resource indication field includes resource block information (a position of a resource block) of data (DL or UL) that is sent in the subframe by a STA scheduled in the subframe. Optionally, the "resource indication" information may further include MCS information of data that is sent on one or more resource blocks assigned by the STA.

Figure 5:
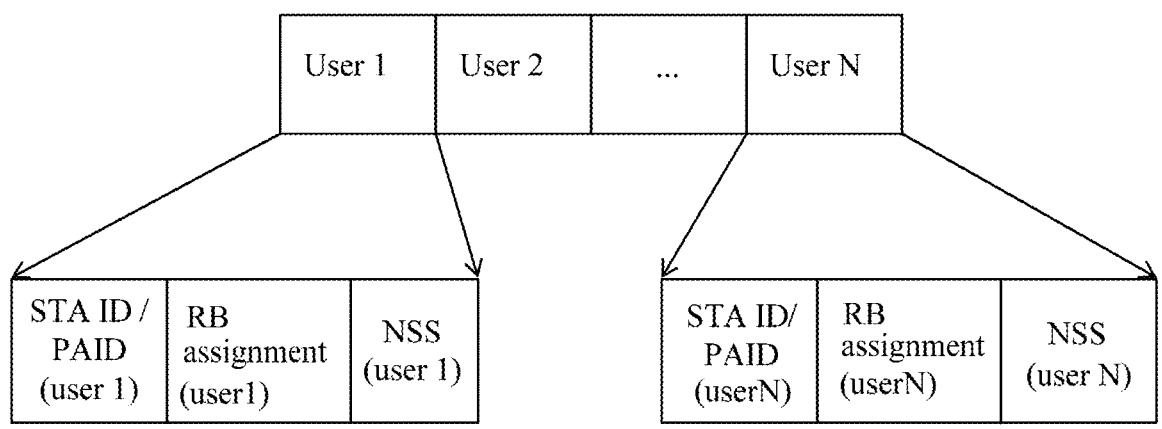
FIG. 5 is a schematic diagram of a frame used for resource indication according to another embodiment of the present invention.

As shown in FIG. 5 to FIG. 8, FIG. 5 to FIG. 8 show several simple schematic diagrams of frames that perform resource indication based on a user. Referring to FIG. 5, it is assumed that N STAs are scheduled in each subframe, the "resource indication" field indicates a resource indication field according to each STA, and N is a natural number. A resource indication field of each STA includes an identifier of the STA, resource block information, a modulation and coding scheme MCS, and the like.

An example of the identifier of the STA is an associated station ID (Associated Identifier, AID/Partial AID). Optionally, the resource indication field of each STA may further include a number of spatial streams, where the spatial streams refer to different streams that are formed by signals that are separately and concurrently sent by multiple antennas and separately coded; the number of spatial streams is a number of different streams. The resource indication field of each STA may further include one of power control indication, retransmission indication, or new data indication, or a combination thereof, or the like.

As pointed out in the foregoing, in addition to a resource indication field of a single STA, the resource indication field may further indicate resource indication of a user group using a multi-user multiple-input multiple-output technology (Multi-User Multiple-Input Multiple-Output, MU-MIMO for short).

For the resource indication of the MU-MIMO user group, there may be two conditions. One condition is that the resource indication field does not include the identifier (Group ID) of the MU-MIMO user group, that is, including only a user identifier ID that uses a single user as a unit, resource block information and a modulation and coding scheme MCS that are corresponding to the user identifier ID, and the like. A same resource block is indicated for multiple users in the user group using the multi-user multiple-input multiple-output MU-MIMO technology. As shown in FIG. 5, each user obtains resource block information of the user by means of parsing. For users in the MU-MIMO user group, parsed resource blocks have a same part.

Figure 6:
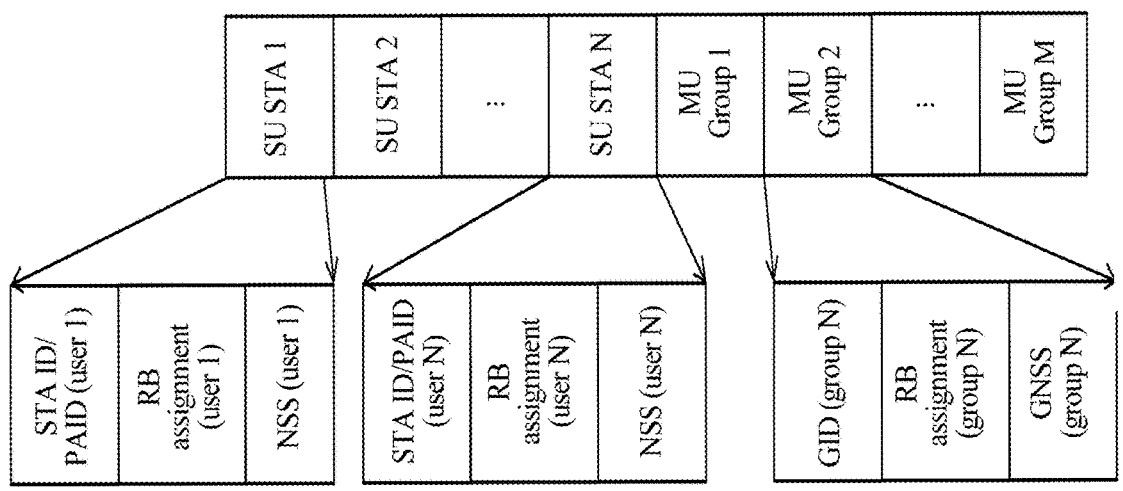
FIG. 6 is a schematic diagram of a frame used for resource indication according to an embodiment of the present invention.

Another condition is that the resource indication field includes the identifier (Group ID) of the MU-MIMO user group, resource block information, a modulation and coding scheme MCS, and the like. As shown in FIG. 6, resource indication fields of different users (a single-user SU-MIMO or a multi-user MU-MIMO) are successively carried on the "resource indication" field. The sequence is random, and a specific sequence may be followed to improve system efficiency. For example, resource indication of the MU user may be placed at a position in a front resource indication field. In this way, more STAs may decode time-frequency resources of the STAs earlier, which may improve overall efficiency of system resources. The foregoing term "front" is: the resource indication of the MU user is placed at a front position in the resource indication field as a whole, for example, a timeslot is at a front position, and the like. It does not mean that a resource of the SU user needs to be indicated only after resource indications of all MU users are completed.

Figure 7:
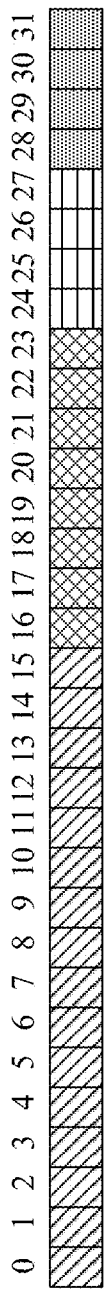
FIG. 7 is a schematic diagram of a resource indication manner according to an embodiment of the present invention.

More specifically, resource block information mentioned in the foregoing frames may perform indication in multiple manners, such as a Bitmap (bitmap) indication manner or an offset indication manner. In the Bitmap indication manner, a required time-frequency resource is indicated by using a bit position. For example, there are 0-31 RB resources, and a downlink STA1 is assigned 0-15 RBs, and then the Bitmap indication manner is 11111111111111110000000000000000. In the offset indication manner, a required time-frequency resource is indicated by using a start point and an offset. Referring to FIG. 7, for example, there are 0-31 RB resources, and a downlink STA2 is assigned 16-23 RBs, and then the offset indication manner indicates the start point and the offset: 10000 00111.

In addition, in the foregoing indication manner of the resource block information, an indication manner that is based on a variable-length resource block may also be used. Specifically, the indication manner that is based on the variable-length resource block is to set resource block (RB) units of several different quantities of subcarriers, and assign variable-length RB units to different users. This is different from the Bitmap indication manner and the offset indication manner in which the resource block (RB) unit includes a fixed quantity of subcarriers. For example, for an OFDMA system including 56 available subcarriers, 3 variable-length RB units RB1, RB2, and RB3 are set, where the RB1 includes 14 subcarriers, the RB2 includes 26 subcarriers, and the RB3 includes 56 subcarriers; for an OFDMA system including 114 available subcarriers, 4 variable-length RB units RB1, RB2, RB3, and RB4 are set, where the RB1 includes 14 subcarriers, the RB2 includes 26 subcarriers, the RB3 includes 56 subcarriers, and the RB4 includes 114 subcarriers; for an OFDMA system including 242 available subcarriers, 5 variable-length RB units RB1, RB2, RB3, RB4, and RB5 are set, where the RB1 includes 14 subcarriers, the RB2 includes 26 subcarriers, the RB3 includes 56 subcarriers, the RB4 includes 114 subcarriers, and the RB5 includes 242 subcarriers. For a STA3, a start point position and an identifier of the RB unit, or another method may be used to indicate a resource assigned to the STA3. For example, in the OFDMA system including 242 available subcarriers, identifiers of the RB1 to the RB5 are 000/001/010/011/100; and the start point may be defined according to the identifiers of the subcarriers, or may be defined according to an RB unit of a smallest quantity of the subcarriers (such as 14 RBs). It is assumed that the RB3 (56 subcarriers) is assigned to the STA3, and a start point is the 43$^{rd}$ subcarrier. If the start point is defined according to the identifiers of the subcarriers, a resource indication manner of the STA is: 00101010 010; if the start point is defined according to a unit of the smallest quantity of RBs, the indication manner of the STA is: 0100 010.

OFDMA multi-user scheduling may be supported in a WLAN by using the foregoing various frames; a resource indication manner based on a user applies to a single-user SU scenario and a multi-user MU MIMO scenario; in this way, a WLAN system may efficiently perform a STA resource assignment indication.

Preferably, in the foregoing frames, the resource indication field may further be divided into more than two zones or parts, as shown in FIG. 8. Each STA assigns MAP information of the STA to a zone according to a specific norm. In a specific implementation manner, the norm for zone division may include but is not limited to one of the following: dividing a zone based on a STA ID, for example, remainders are taken from the STA ID and a quantity of blocks of the zone that are obtained by means of division, and a sequence number of a block that is obtained by means of zone division and to which the STA ID belongs is determined according to the remainders; dividing a zone based on a QoS requirement, for example, a resource indication field of a STA with a high-priority service is placed at a front block of the zone; or dividing a zone based on types of uplink and downlink services, for example, a resource indication field of a STA of a downlink service is placed at a first zone, and a resource indication field of a STA of an uplink service is placed at a second zone. Currently, the foregoing norms for dividing the zone may be combined at random without violating logic, and details are not described herein.

When a frame with zone division shown in FIG. 8 is used in the communications system, a station receiving the frame directly reads a resource indication field of the station from a zone corresponding to the station according to one of the foregoing various norms for dividing the zone. When there are many STAs, a STA placed at a rear position of the resource indication may find the resource indication field of the STA (resource indication fields of the STA in a downlink subframe and an uplink subframe) without completely reading all resource indication content. In this way, a speed at which the STA reads the resource indication field is increased.

Preferably, for the foregoing various possible frames used for resource indication, the resource indication field may further include type (type) information of the resource indication. Optionally, the resource indication field may further explicitly or implicitly include length information of the resource indication (referring to FIGS. 9A-C).

Different types of resource indication fields are defined in Table 1. Several different types of resource indication fields are provided in Table 1; for example, a type indicated by "000" is downlink scheduling with single stream (DL scheduling with single stream), a type indicated by "001" is downlink scheduling in spatial multiplexing (DL scheduling in spatial multiplexing), a type indicated by "010" is downlink MU-MIMO scheduling (DL MU-MIMO scheduling), a type indicated by "011" is uplink scheduling (UL scheduling), and a type indicated by "100" is uplink MU-MIMO scheduling (UL scheduling). Different types of the resource indication fields may have different lengths and resource assignment and configuration manners (referring to FIGS. 9A to 9C).

TABLE 1

| Resource indication type ID | Resource indication description |
| --- | --- |
| 000 | DL scheduling with single stream |
| 001 | DL scheduling in spatial multiplexing |
| 010 | DL MU-MIMO scheduling |
| 011 | UL scheduling |
| 100 | UL MU-MIMO scheduling |
| 101-111 | Reserved |

By using the foregoing frames, the STA may learn a format of the resource indication field by decoding resource indication (type ID) information; and optionally, a length may further be learned. In this way, the STA learns, by reading a MAP type, a length that is to be used to read the MAP information, which avoids searching by using MAPs of various lengths and speeds up reading of a MAP.

In the foregoing implementation manners, the resource indication field may include the resource block (RB) information, the MCS information, and SID/GID information; and optionally, the resource indication field may further include one of the resource indication type (type), the information about the number of the spatial streams (number of spatial streams, NSS for short), the new data indication (New Data indication), a retransmission time (HARQ process number), redundant version information, or power control information TPC, or any combination thereof. Alternatively, the foregoing optional information may not be included in the resource indication field, or may be multiplexed with information in the resource indication field in a specific manner, for example, the SID/GID information may be scrambled together with a check bit. Referring to FIG. 9A to 9C, FIG. 9A to 9C are several specific examples of the resource indication field, which may be applied to the frames in the foregoing various implementation manners. The type (type) of the resource indication may stipulate, according to a specific format, one piece of or a combination of the foregoing information, so that the resource indication field occupies fewer communication resources. For example, FIG. 9A is a simple schematic diagram of a resource indication field whose type is the downlink scheduling with single stream; FIG. 9B is a simple schematic diagram of a resource indication field whose type is the downlink scheduling in spatial multiplexing; FIG. 9C is a simple schematic diagram of a resource indication field whose type is the uplink scheduling.

In a system in which one of the foregoing frames is applied, an access point sends a downlink subframe of the foregoing frames; a STA scheduled by the downlink subframe receives these frames, and finds, by means of decoding, a resource indication field of the STA included in the subframe or a subsequent subframe, and performs communication on a resource block indicated by the resource indication field. A downlink subframe including the downlink resource indicator DL MAP is used as an example. A STA scheduled by the downlink subframe can obtain, by means of decoding, resource block information used for sending downlink data and MCS information used for sending the downlink data; the STA scheduled by the downlink subframe sends, on a resource block (that is, a position of an indicated resource) corresponding to a subsequent downlink subframe (DL subframe), the downlink data by using the MCS information. A downlink subframe including the uplink resource indicator UL MAP is used as an example. A STA scheduled by the downlink subframe can obtain, by means of decoding, resource block information used for sending uplink data and MCS information for sending the uplink data; the STA scheduled by the downlink subframe sends, on a resource block (that is, a position of an indicated resource) corresponding to a subsequent uplink subframe (UL subframe), the uplink data by using the MCS information.

Correspondingly, another implementation manner provides a resource indication processing apparatus (not shown), which is applied to a wireless local area network that uses an OFDMA technology. The resource indication processing apparatus includes a processing unit, configured to send or receive a frame including a resource indication field, where the resource indication field includes an identifier of a user, and resource block information and modulation and coding scheme MCS information that are corresponding to the identifier of the user. For a specific structure and content of the frame, reference may be made to the foregoing implementation manners, and details are not described herein. The processing unit may be a general purpose processor, a digital signal processor, an application-specific integrated circuit, a field programmable gate array, or another programmable logic device, discrete gate or transistor logic device, or discrete hardware component, and the processing unit may implement or execute the methods, steps, and logical block diagrams disclosed in the embodiments of the present invention. The general purpose processor may be a microprocessor, any conventional processor, or the like. Steps of the methods disclosed with reference to the embodiments of the present invention may be directly executed and completed by means of a hardware processor, or may be executed and completed by using a combination of hardware and software modules in the processor. It is easily understood that the foregoing resource indication processing apparatus may be located in an access point when being specifically configured to send the frame including the resource indication field; the resource indication processing apparatus may be located in a station when being specifically configured to receive the frame including the resource indication field.

Figure 10:
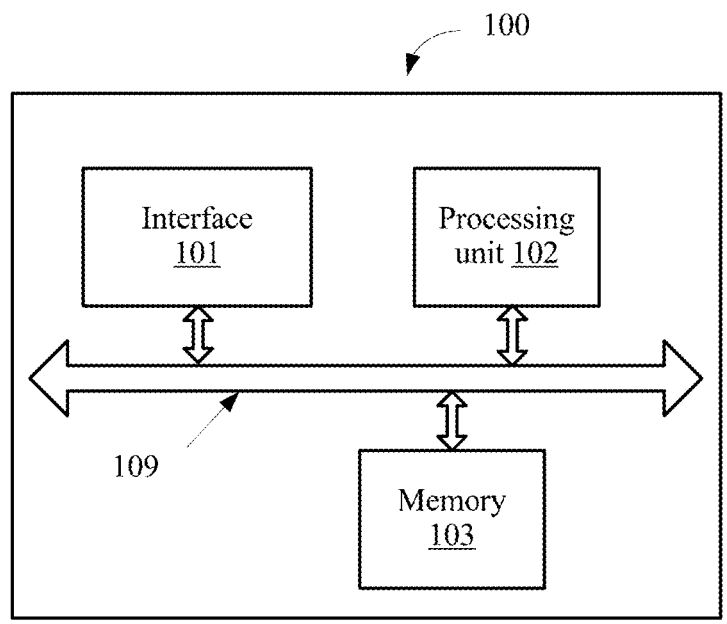
FIG. 10 is a block diagram of an access point according to an embodiment of the present invention.

FIG. 10 is a block diagram of an access point according to another embodiment of the present invention. The access point in FIG. 10 includes an interface 101, a processing unit 102, and a memory 103. The processing unit 102 controls an operation of an access point 100. The memory 103 may include a read-only memory and a random access memory, and provides an instruction and data to the processing unit 102. A part of the memory 103 may further include a non-volatile random access memory (NVRAM). All components of the access point 100 are coupled together by using a bus system 109. In addition to a data bus, the bus system 109 includes a power bus, a control bus, and a status signal bus. However, for clear description, various buses in the figure are marked as the bus system 109.

The foregoing methods that are used to send the foregoing various frames and that are disclosed in the embodiments of the present invention may be applied to the processing unit 102, or implemented by the processing unit 102. In an implementation process, each step of the foregoing methods may be completed by means of an integrated logic circuit of hardware in the processing unit 102 or an instruction in a software form. The processing unit 102 may be a general purpose processor, a digital signal processor, an application-specific integrated circuit, a field programmable gate array, or another programmable logic device, discrete gate or transistor logic device, or discrete hardware component, and the processing unit 102 may implement or execute the methods, steps, and logical block diagrams disclosed in the embodiments of the present invention. The general purpose processor may be a microprocessor, any conventional processor, or the like. Steps of the methods disclosed with reference to the embodiments of the present invention may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 103, and the processing unit 102 reads information in the memory 103 and completes the steps in the foregoing methods in combination with hardware of the processing unit 102.

Figure 11:
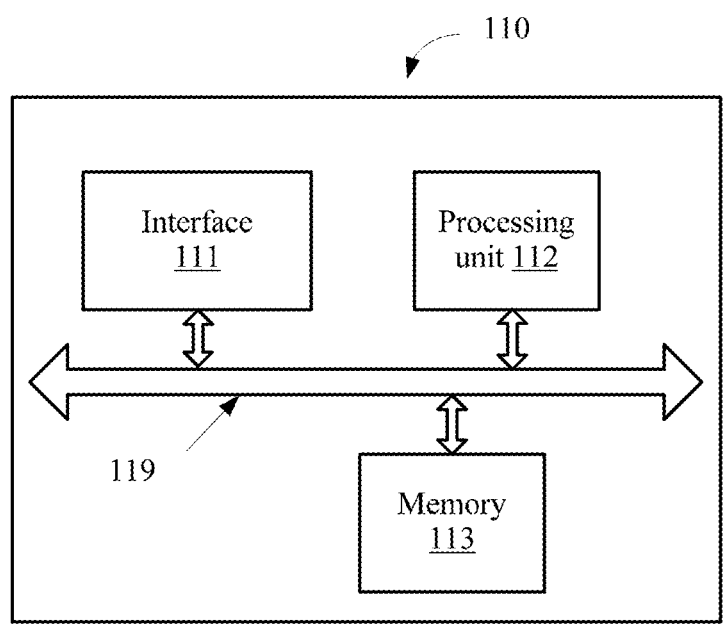
FIG. 11 is a block diagram of a station according to an embodiment of the present invention.

FIG. 11 is a block diagram of a station according to another embodiment of the present invention. An access point in FIG. 11 includes an interface 111, a processing unit 112, and a memory 113. The processing unit 112 controls an operation of a station 110. The memory 113 may include a read-only memory and a random access memory, and provides an instruction and data to the processing unit 112. A part of the memory 113 may further include a non-volatile random access memory (NVRAM). All components of the base station 110 are coupled together by using a bus system 119. In addition to a data bus, the bus system 119 includes a power bus, a control bus, and a status signal bus. However, for clear description, various buses in the figure are marked as the bus system 119.

The foregoing methods that are used to receive the foregoing various frames and that are disclosed in the embodiments of the present invention may be applied to the processing unit 112, or implemented by the processing unit 112. In an implementation process, each step of the foregoing methods may be completed by means of an integrated logic circuit of hardware in the processing unit 112 or an instruction in a software form. The processing unit 112 may be a general purpose processor, a digital signal processor, an application-specific integrated circuit, a field programmable gate array, or another programmable logic device, discrete gate or transistor logic device, or discrete hardware component, and the processing unit 112 may implement or execute the methods, steps, and logical block diagrams disclosed in the embodiments of the present invention. The general purpose processor may be a microprocessor, any conventional processor, or the like. Steps of the methods disclosed with reference to the embodiments of the present invention may be directly executed and completed by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 113, and the processing unit 112 reads information in the memory 113 and completes the steps in the foregoing methods in combination with hardware of the processing unit 112.

Specifically, the memory 113 stores an instruction that enables the processing unit 112 to perform the following operation: a station-side method in each implementation manner.

Figure 12A:
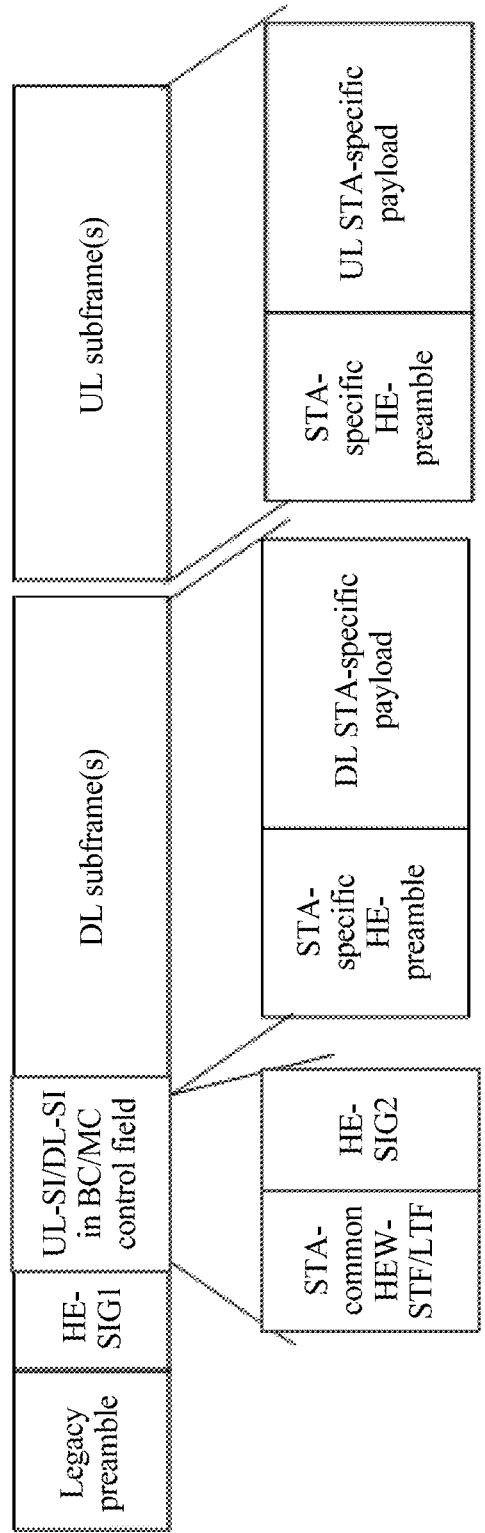
FIG. 12*a*-12*b* are respectively schematic diagrams of frame structures according to an embodiment.
Figure 12B:
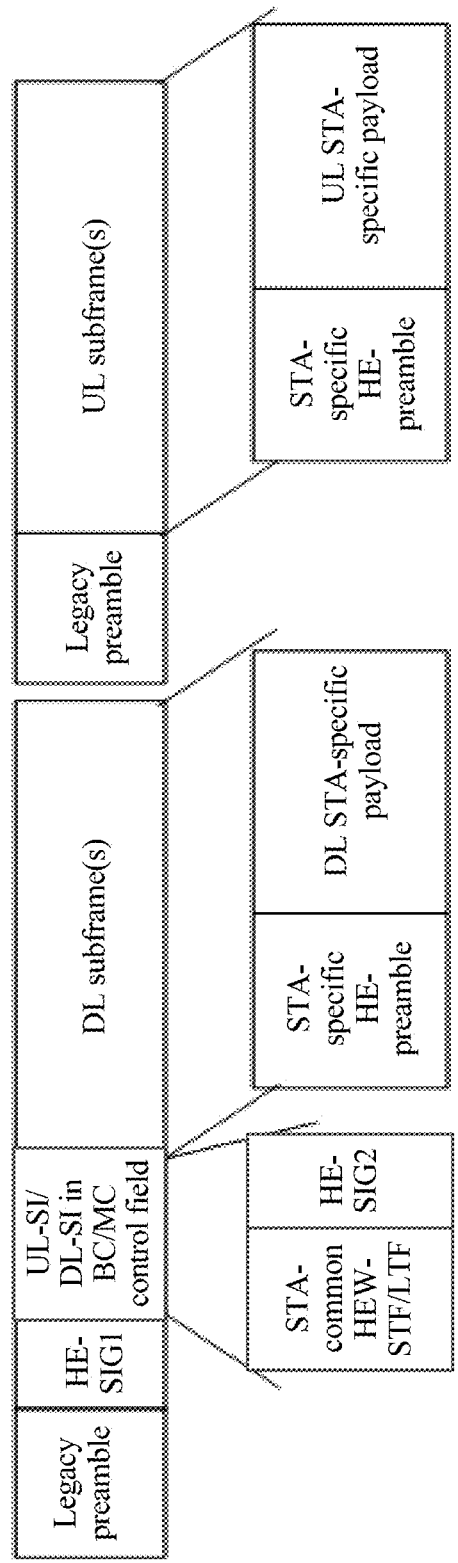

In a more specific example, a frame of an 802.11ax is used as an example to describe an implementation manner of the present invention. Referring to FIG. 12a and FIG. 12b, FIG. 12a shows a schematic diagram of a PLCP protocol data unit (PPDU, PLCP Protocol Data Unit) frame structure sent by an AP according to an embodiment of the present invention, and FIG. 12b shows a schematic diagram of another PPDU frame structure sent by a STA according to this embodiment of the present invention.

As shown in FIG. 12a and FIG. 12b, a solution of a frame format that gives consideration to both contention and scheduling access and that is used to efficiently indicate multi-user control signaling is provided. A radio frame (Radio frame) includes a legacy frame header (Legacy Preamble) part, a frame control field (Control Field) of the 802.11 ax, one or several consecutive downlink transmit subframes (DL subframe), and one or several subsequent consecutive uplink transmit subframes (UL subframe). A minimum processing time (SIFS) interval in a WiFi system is required between the downlink transmit subframe (DL subframe) and the uplink transmit subframe (UL subframe). Based on FIG. 12a, the legacy frame header (Legacy Preamble) part may be added before the uplink transmit subframe (UL subframe), as shown in FIG. 12b.

The frame control field of the 802.11ax includes an HE-SIG1 (High Efficiency-Signal Field, high efficiency wireless local area network signaling field common control information field (HE-SIG1) indicating uplink and downlink subframes, and a common control signaling field (Broadcast/Multicast control subframe) indicating multi-user scheduling information (UL/DL Scheduling Information) in the uplink/downlink subframe. The HE-SIG1 indicates common control information (such as information about system bandwidth, a quantity of subsequent DL/UL subframes, a start time, and a length, and if necessary, sending STA-common control information of an HE-SIG2), but STA-specific control information is included in the HE-SIG2. For the purpose of receiving control information by using system bandwidth specified in the HE-SIG1, a STA-common HE-LTF (STA-common HE-LTF) needs to be used to provide a channel estimate for a STA of the HE to detect HEW multi-user scheduling information (SI) in the HE-SIG2. The HE-LTF herein may support high-order modulation on HE-SIG2 to improve a transmit rate of multi-user scheduling signaling. The downlink transmit subframe (DL subframe) and the uplink transmit subframe (UL subframe) include a STA-specific HE-preamble and a STA-specific data part. Detailed description is given in the embodiments.

The foregoing common control signaling field includes at least a STA-common HE-preamble (multi-user-common high efficiency wireless local area network preamble), and may further include an HE-SIG2 field. The STA-common HE-preamble field includes scheduling information of at least two STAs, where the scheduling information includes at least uplink control information that is used to instruct the AP to allow the at least two STAs to send uplink data.

L-preambles shown in FIG. 12a and FIG. 12b are legacy WLAN physical layer frame headers, including a legacy short training field L-STF, a legacy long training field L-LTF, and a legacy signaling field L-SIG.

In a specific example, the HE-SIG1 field is used to store information about the DL subframe and/or the UL subframe and information about the STA-common HE-preamble, where the information about the DL subframe includes information that is used to indicate sending bandwidth of the DL subframe, a quantity of the DL subframes, a start time, a length, and the like. The information about the UL subframe includes information that is used to indicate sending bandwidth of the UL subframe, a quantity of the UL subframes, a start time, a length, and the like. The information about the STA-common HE-preamble includes parameters used to detect first detection reference information of the scheduling information, such as a specified channel and a sequence length.

The STA-common HE-preamble includes: a STA-common HE-STF/LTF field and the HE-SIG2 field; content of the STA-common HE-STF/LTF field is used to detect content of the HE-SIG2 field.

The STA-common HE-STF field is used to store an AGC for receiving, on a specified channel, the HE-SIG2; the STA-common HE-LTF field is used to store a channel estimate used to indicate the HE-SIG2.

The HE-SIG2 field is used to store scheduling control information (scheduling information, SI) of the STA, where uplink control information in the scheduling information may include information about an assigned channel resource, a precoding scheme (precoding vector), a data length, a spatial stream, and the like.

In a specific embodiment, the HE-SIG2 field may include the uplink control information, and may further include downlink control information, where the downlink control information is used to instruct the AP to allow the at least two STAs to receive the downlink data. The downlink control information includes at least information about a resource assigned to the STA by the AP, such as an assigned channel resource and an assigned spatial stream.

In some embodiments, the downlink control information may be divided into two parts, which are respectively stored in the HE-SIG2 field and an HE-SIG3 field. The HE-SIG2 field stores first downlink control information, where the first downlink control information includes information about a channel resource assigned to the STA by the AP, such as sub-channel information and a spatial stream. The HE-SIG3 field stores second downlink control information, where the second downlink control information includes sending parameters such as a coding format and a data length. The HE-SIG3 field is sent in the DL subframe.

Specifically, in each implementation manner, the DL subframe field may include a STA-specific HE-preamble (STA-specific high efficiency wireless local area network preamble), and SU-MIMO DL data (single-user downlink data), or MU-MIMO DL data (multi-user downlink data), where the MU-MIMO DL data is downlink data sent by the AP, by using a same time-frequency resource, to multiple STAs located in different directions.

For example, a DL subframe field in an embodiment may include a STA-specific HE-STF field, a STA-specific HE-LTF field, or the HE-SIG3 field.

Specifically, content of the STA-specific HE-STF field is used to indicate an AGC for sending the downlink data; content of the STA-specific HE-LTF field is used to indicate a channel estimate of the STA; content of the HE-SIG3 field is used to indicate sending parameters of data, such as MCS and a data length.

Specifically, in each implementation manner, a UL subframe field may include SU-MIMO UL data (single-user uplink data) or MU-MIMO UL data (multi-user uplink data), where the MU-MIMO UL data is uplink data sent by the AP, by using the same time-frequency resource, to multiple STAs located in different directions; the UL subframe field may further include the HE-SIG3 field, where the content of the HE-SIG3 is used to indicate the sending parameters of the data, such as the MCS and the data length.

Figure 13:
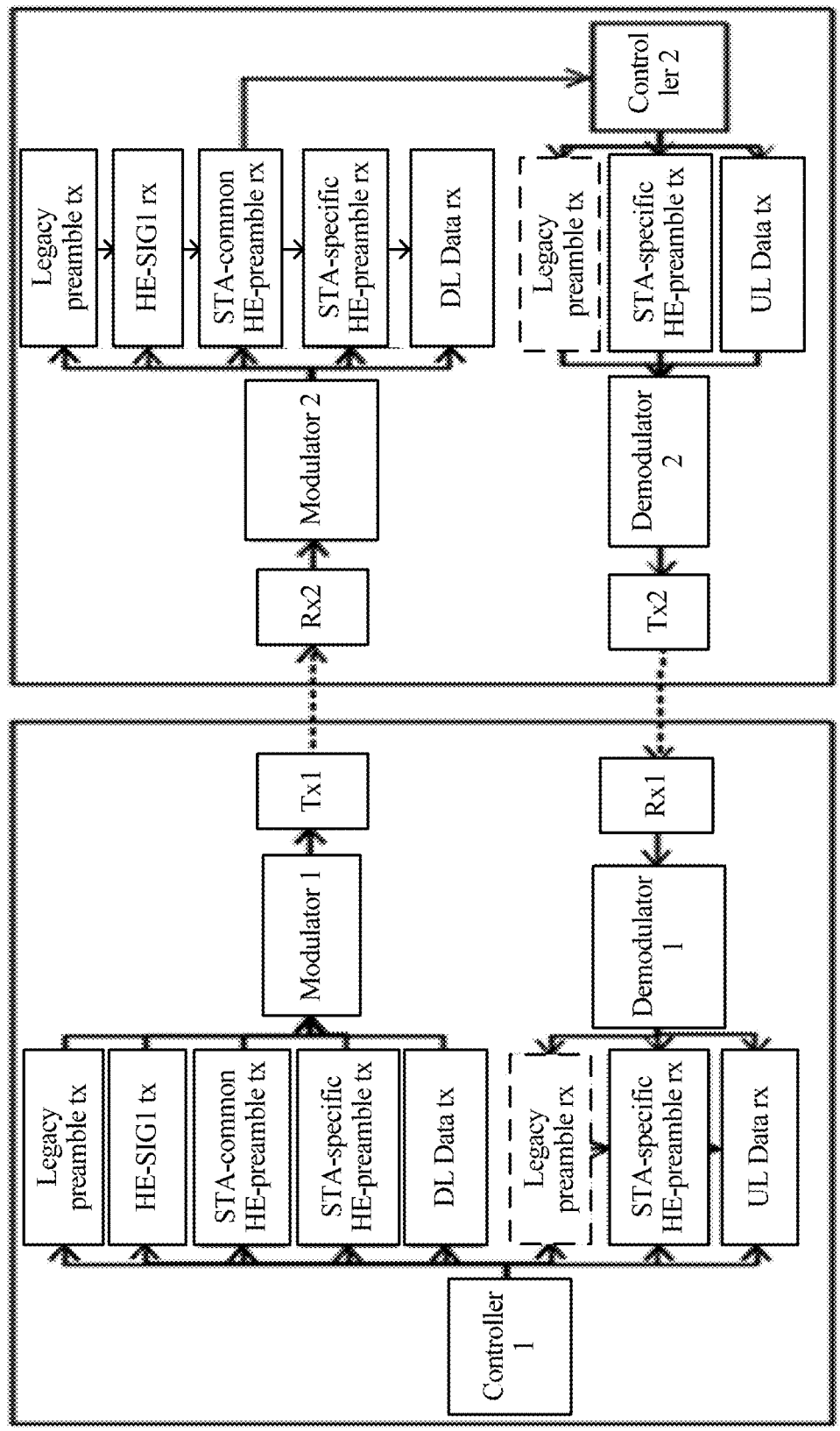
FIG. 13 is a schematic diagram of a working principle of a system.

Referring to FIG. 13, FIG. 13 shows a working system in which the foregoing frame structure is used. A left part of FIG. 13 shows a process or a principle of sending, by an AP, the foregoing PPDU frame structure to a STA. A transmit end (AP) includes a processing unit and an interface, where the interface specifically includes a receiver Rx 1 and a transmitter Tx 1; and the processing unit includes a controller 1, a modulator 1, and a demodulator 1. A working principle of the transmit end is described below.

Specifically, an L-preamble, an HE-SIG1, and a STA-common HE-preamble are sent on an entire channel specified by the AP. Content of DL subframes of each STA is respectively sent on a sub-channel corresponding to each STA to implement that multiple users share a spectrum resource or spatial resource at the same time without mutual interference, so as to improve utilization of the spectrum resource and the spatial resource.

A right part of FIG. 13 shows a processing procedure or principle of receiving, by the receive end (STA), the foregoing PPDU frame structure. The receive end (STA) includes a processing unit and an interface, where the interface specifically includes a receiver Rx 2 and a transmitter Tx 2; and the processing unit includes a controller 2, a modulator 2, and a demodulator 2. A working principle of the receive end is described below.

Specifically, after receiving the foregoing PPDU frame format, the receive end (STA) first performs, according to content of an L-STF field in an L-preamble and on the channel specified by the AP, initial time synchronization, CFO (frequency offset) estimation, and estimation of an AGC (automatic gain control) for sending a signal; the receive end (STA) further performs, on the specified channel, the time synchronization and the CFO estimation according to content of an L-LTF field, and, in addition, obtains a channel estimate of the specified channel; and the receive end (STA) may detect the content of the L-SIG field according to the obtained channel estimate.

Content of the HE-SIG1 is detected according to the channel estimate obtained by using the L-LTF field, so as to obtain parameters of a UL subframe, a DL subframe, and a STA-common HE-preamble, such as sending bandwidth and a sequence length. The STA further determines fields of the DL subframe in a WLAN physical layer frame according to the parameters of the DL subframe.

As pointed out in the foregoing, in an example, the HE-SIG1 field may further include sending parameters of an HE-SIG2, such as an MCS (Modulation and Coding Scheme, modulation and coding scheme) used to send the HE-SIG2, an ID of a STA indicated by the HE-SIG2, where the ID may be an AID (Association Identifier, association identifier), or, the ID may further be a PAID (Partial AID). The PAID is an association identifier that combines content such as the AID and BSSID that is of a serving AP, and/or an ID of a user group. In this case, the receive end detects content of the HE-SIG2 according to the sending parameters of the HE-SIG2 included in the HE-SIG1. The AP may send the content of the HE-SIG1 field in a multicast manner. If the STA detects that the HE-SIG1 fields do not include identifier information of the STA, the STA does not continue to detect a subsequent frame structure, which reduces detection time of the STA.

Content of a STA-common HE-STF/LTF field is detected according to the parameters obtained from the HE-SIG1 field; an AGC of the HE-SIG2 field that is received on the specified channel is then obtained according to the content of the STA-common HE-STF field; and a channel estimate of the HE-SIG2 field on the specified channel is obtained according to the content of the STA-common HE-LTF field, and the content of the HE-SIG2 field is further detected according to the channel estimate.

If the STA detects that the HE-SIG2 field includes DL SI (Downlink Scheduling Information, downlink scheduling information) of the STA, that is, downlink control information of the STA, the STA obtains content of a STA-specific HE-STF/LTF field according to the detected content of the HE-SIG2 field, and further obtains, according to the content of the STA-specific HE-STF, an AGC for receiving, by the STA, the downlink data. The channel estimate of the specified channel is obtained according to the content of the STA-specific HE-LTF field, and the channel estimate is used to detect content of an HE-SIG3 field, so as to obtain sending parameters of the downlink data, such as an MCS and a data length.

The STA finds, according to information about the DL subframe that is detected in the HE-SIG1 field and the foregoing parameters (the AGC, the channel estimate, and the sending parameters), a start time and a length of a DL subframe in which downlink data of the STA is located.

If the STA detects that the HE-SIG2 field includes UL SI (Down Link Scheduling Information, downlink scheduling information) of the STA, that is, uplink control information of the STA, the STA finds, according to the detected uplink control information in the HE-SIG2 field and the information about the UL subframe in the HE-SIG1 field, a start time and a length of a UL subframe uplink used by the STA to send data.

In this embodiment, a STA-specific HE-preamble may include the STA-specific HE-STF field, the STA-specific HE-LTF field, and the STA-specific HE-SIG3 field. When the STA detects that the HE-SIG2 includes the UL SI of the STA, the STA sets a parameter of the STA-specific HE-preamble according to the UL SI, and generates the content of the STA-specific HE-STF field and the STA-specific HE-LTF field according to the parameter of the STA-specific HE-preamble.

If the STA has a capability of adjusting a sending parameter for sending uplink data, for example, the STA obtains an uplink sending parameter by adjusting the MCS and the length information, and the like based on received downlink scheduling information and the channel estimate, and stores the uplink sending parameter in the HE-SIG3 field following the STA-specific HE-STF and the STA-specific HE-LTF, and sends, on a transmit channel corresponding to the STA, the content of the HE-SIG3 to the AP.

The UL Data may include SU UL Data (single-user uplink data) or MU UL data (multi-user uplink data), where the MU UL data is uplink data sent by the STA, by using a same time-frequency resource, to the AP in different directions.

After sending content of an HE-SIG3 field corresponding to each STA, each STA sends, on a sub-channel of each STA, uplink data of each STA.

The AP detects content of a STA-specific HE-STF field and a STA-specific HE-LTF field that are in an uplink subframe sent by the STA, and obtains, by using the content of the STA-specific HE-STF field, an AGC for receiving the uplink data of the STA; the AP obtains a channel estimate of the STA by using content of the STA-specific HE-LTF field; and the AP detects the content of the HE-SIG3 field according to the channel estimate, and obtains the uplink sending parameters such as the MCS and the data length. Finally, the AP codes and modulates the received uplink data according to the foregoing parameters (the AGC, the channel estimate, and the uplink sending parameters).

For the foregoing description, the following provides several more specific frame structures. Functions of the fields of the frame structures are described in detail in the foregoing, and the frame structures herein are only used to present changes of the frame structures.

Figure 14A:
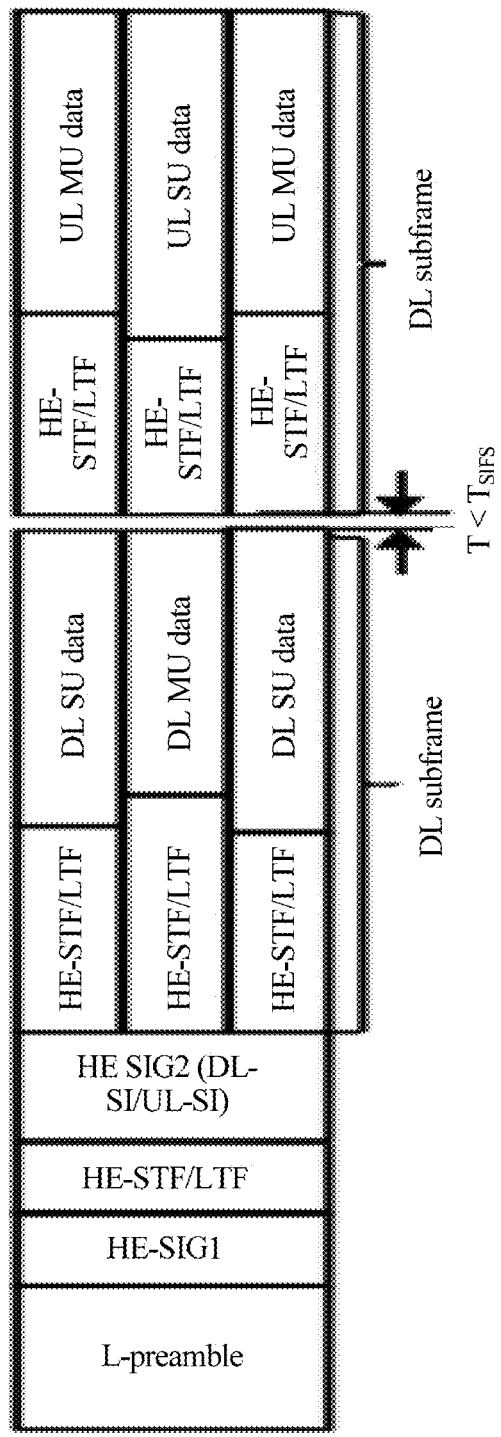
FIG. 14*a*-14*i* are respectively schematic diagrams of several frame structures.

In a frame shown in FIG. 14a, an HE-SIG2 includes scheduling information SI of a STA in a DL subframe and scheduling information SI of a STA in a UL subframe. All stations (users) or a group of users indicated in an HE-SIG1 need to detect information about the HE-SIG2. If a station detects control information of the station in DL-SI, in a subsequent DL subframe, the station needs to receive data according to scheduling information indicated by an AP; if the station detects the control information of the station in UL-SI, in a subsequent UL subframe, the station needs to receive data according to the scheduling information indicated by the AP. In the DL subframe, the AP does not need to additionally transfer a SIG field of the DL SI, and a UL subframe sent by the STA does not need to include a SIG field used for notification of the UL SI, that is, this frame structure is used in a scenario in which the AP centrally controls uplink multi-user transmission.

Specifically, for a working principle shown in FIG. 13, when the frame structure shown in FIG. 14a is used, in a STA-specific HE-preamble of a downlink AP, an HE-SIG3 part is not sent; in a STA-specific HE-preamble of a downlink STA receive end, the HE-SIG3 part is not received; in an uplink STA transmit end, a STA Control Unit module does not have a scheduling parameter adjusting function, and in a STA-specific HE-preamble, the HE-SIG3 part is not sent, and in a STA-specific HE-preamble of an uplink AP receive end, the HE-SIG3 part is not received.

Figure 14B:
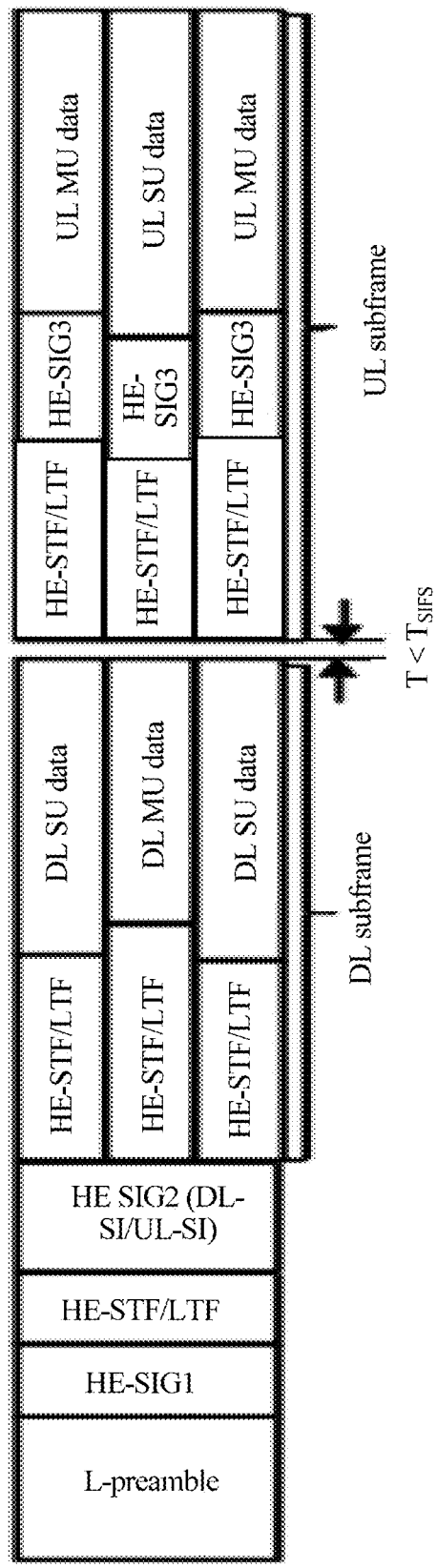

In a frame shown in FIG. 14b, an HE-SIG2 includes the scheduling information SI of the STA in the DL subframe and the scheduling information SI of the STA in the UL subframe. All the users or the group of users indicated in the HE-SIG1 need to detect the information about the HE-SIG2. If the station detects control information of the station in the DL-SI, in the subsequent DL subframe, the station needs to receive the data according to the scheduling information indicated by the AP; if the station detects the control information of the station in the UL-SI, in the subsequent UL subframe, the station needs to receive the data according to the scheduling information indicated by the AP. Different from FIG. 14a, the UL subframe includes a SIG field (HE-SIG3) used for the STA to notify or inform the AP of the UL SI. By using this frame structure, based on that the AP centrally controls the uplink multi-user transmission, the STA may further adjust a scheduling parameter according to an actual channel condition when sending data. For example, when burst interference occurs, an MCS may be properly reduced to ensure that a PER requirement is met during data detection.

More specifically, for the working principle shown in FIG. 13, when a frame shown in FIG. 14b is used, in the STA-specific HE-preamble of the downlink AP transmit end, the HE-SIG3 part is not sent; in the STA-specific HE-preamble of the downlink STA receive end, the HE-SIG3 part is not received; in the uplink STA transmit end, the STA Control Unit module has a scheduling parameter adjusting function, and the HE-SIG3 needs to be sent, and correspondingly, in the STA-specific HE-preamble of the uplink AP receive end, the HE-SIG3 part is received.

Figure 14C:
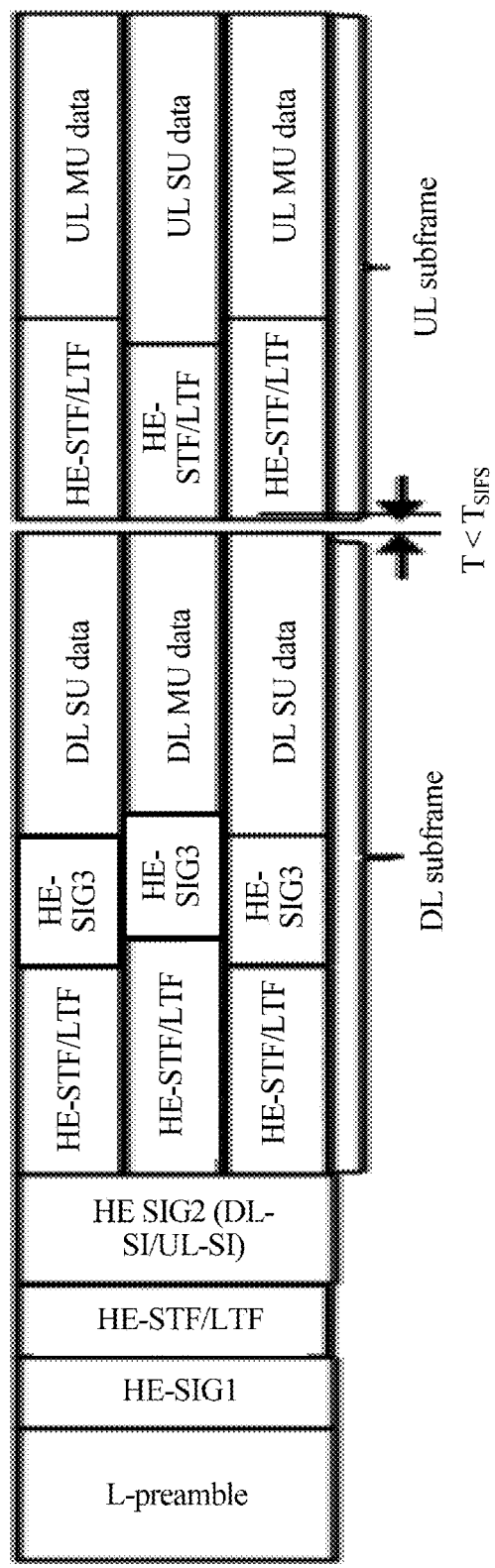

In a frame shown in FIG. 14c, an HE-SIG2 includes the scheduling information SI of the STA in the DL subframe and the scheduling information SI of the STA in the UL subframe. All the users or the group of users indicated in the HE-SIG1 need to detect the information about the HE-SIG2. If the station detects the control information of the station in the DL-SI, in the subsequent DL subframe, the station needs to receive the data according to the scheduling information indicated by the AP; if the station detects the control information of the station in the UL-SI, in the subsequent UL subframe, the station needs to receive the data according to the scheduling information indicated by the AP. Different from FIG. 14a, a DL STA indicated in the HE-SIG2 continues to detect, in the SIG field (HE-SIG3) of the DL subframe, remaining DL SI, which may reduce overhead of a common control information field (HE-SIG2). For example, the AP indicates, in the HE-SIG2, an ID of the DL STA and position information of an assigned resource, and specifically sends, in an HE-SIG3, STA-specific control information such as an MCS, a data length, and a spatial stream. The HE-SIG3 may use LTFs based on frequency multiplexing and spatial multiplexing to obtain control information of different users/streams, so as to improve signaling transmission efficiency.

More specifically, for the working principle described in FIG. 13, when a frame shown in FIG. 14c is used, in the STA-specific HE-preamble of the downlink AP transmit end, the HE-SIG3 part is sent, and in the STA-specific HE-preamble of the downlink STA receive end, the HE-SIG3 part is received; in the uplink STA transmit end, the STA Control Unit module does not have the scheduling parameter adjusting function, and in the STA-specific HE-preamble, the HE-SIG3 part is not sent, and in the STA-specific HE-preamble of the uplink AP receive end, the HE-SIG3 part is not received.

Figure 14D:
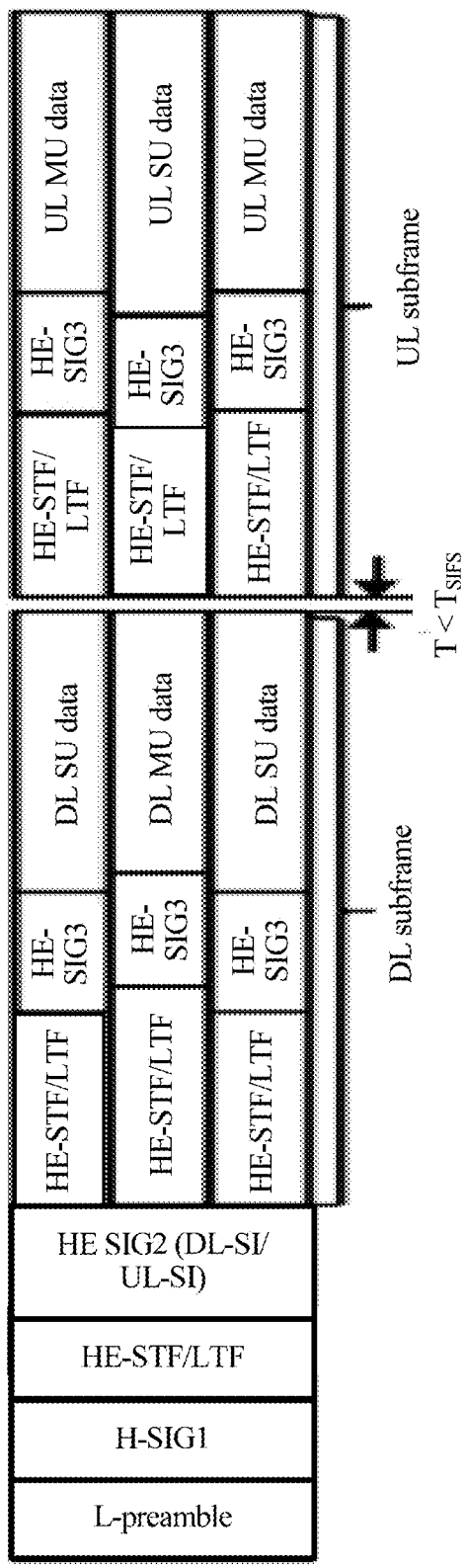

In a frame shown in FIG. 14d, the AP sends, in the HE-SIG2 (FIG. 4), partial SI of the STA in the DL subframe and the SI of the STA in the UL subframe, and in an HE-SIG3 in the DL subframe, the remaining DL SI is additionally sent. Different from the frame shown in FIG. 14c, the UL subframe sent by the STA includes the SIG field (HE-SIG3) used for notification of the UL SI. By using this frame structure, based on that the AP centrally controls the uplink multi-user transmission, the STA may adjust the scheduling parameter according to the actual channel condition when sending the data. For example, when burst interference occurs, the MCS may be properly reduced to ensure that the PER requirement is met during data detection.

More specifically, for the working principle described in FIG. 13, when a frame shown in FIG. 14d is used, in the STA-specific HE-preamble of the downlink AP transmit end, the HE-SIG3 part is sent, and in the STA-specific HE-preamble of the downlink STA receive end, the HE-SIG3 part is received; in the uplink STA transmit end, the STA Control Unit module has the scheduling parameter adjusting function, and in the STA-specific HE-preamble, the HE- SIG3 needs to be sent, and correspondingly, in the STA-specific HE-preamble of the uplink AP receive end, the HE-SIG3 part is received.

Figure 14E:
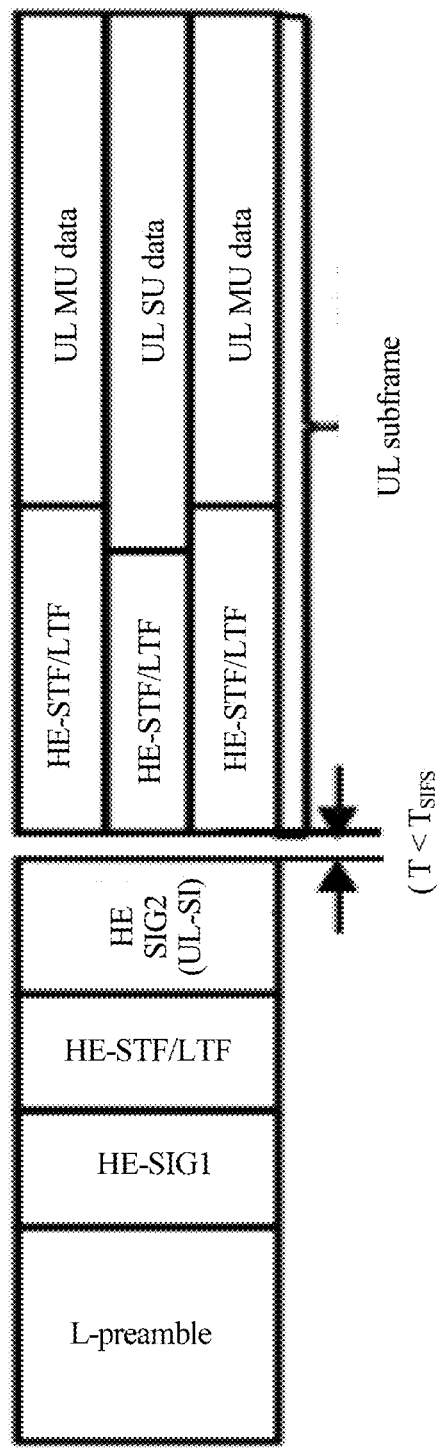

A frame shown in FIG. 14e is a special case of the frame in FIG. 14a, that is, a condition with only the UL subframe but without the DL subframe. The AP sends, in the HE-SIG2, the SI of the STA in the UL subframe. If the STA detects control information of the STA in the UL-SI, in the subsequent UL subframe, the STA needs to receive the data according to the scheduling information indicated by the AP. The UL subframe sent by the STA does not include the SIG field used for notification of the UL SI. An application scenario of this frame is that the AP centrally controls the uplink multi-user transmission.

More specifically, for the working principle described in FIG. 13, when a frame shown in FIG. 14e is used, in the downlink AP transmit end, neither the STA-specific HE-preamble nor the DL Data is sent, and in the downlink STA receive end, neither the STA-specific HE-preamble nor the DL Data is received; in the uplink STA transmit end, the STA Control Unit module does not have the scheduling parameter adjusting function, and in the STA-specific HE-preamble, the HE-SIG3 part is not sent, and in the STA-specific HE-preamble of the uplink AP receive end, the HE-SIG3 part is not received.

Figure 14F:
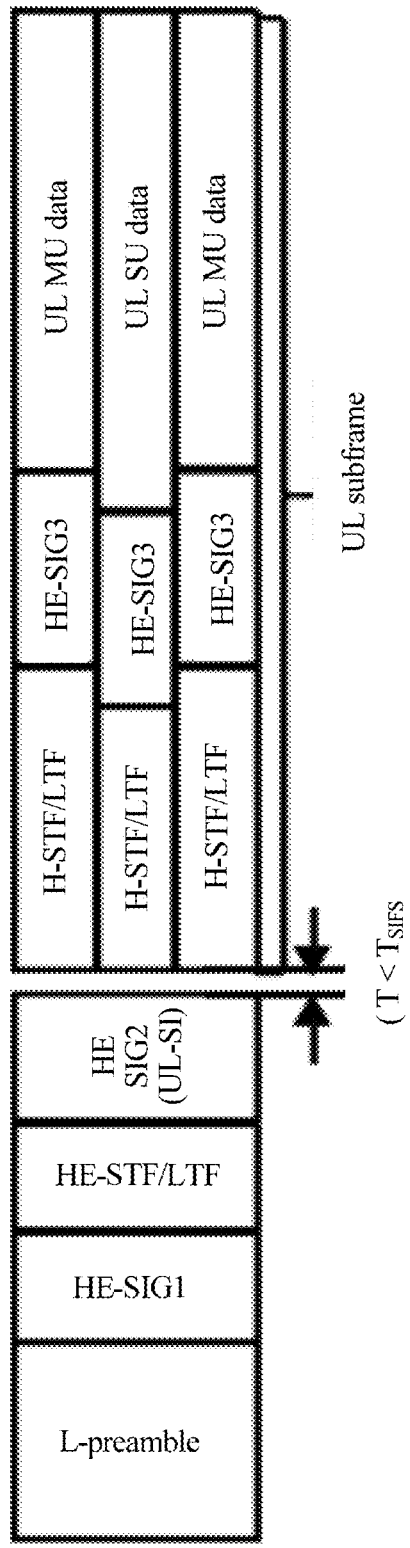

In a frame shown in FIG. 14f, the AP sends, in the HE-SIG2, the SI of the STA in the UL subframe. If the STA detects the control information of the STA in the UL-SI, in the subsequent UL subframe, the STA needs to receive the data according to the scheduling information indicated by the AP. Different from the frame shown in FIG. 14e, the UL subframe includes the SIG field (HE-SIG3) used for notification of the UL SI by the STA. In this way, based on that the AP centrally controls the uplink multi-user transmission, the STA may adjust the scheduling parameter according to the actual channel condition when sending the data.

More specifically, for the working principle described in FIG. 13, when the frame shown in FIG. 14f is used, in the downlink AP transmit end, neither the STA-specific HE-preamble nor the DL Data is sent, and in the downlink STA receive end, neither the STA-specific HE-preamble nor the DL Data part is received; in the uplink STA transmit end, the STA Control Unit module has the scheduling parameter adjusting function, and in the STA-specific HE-preamble, the HE-SIG3 needs to be sent, and correspondingly, in the STA-specific HE-preamble of the uplink AP receive end, the HE-SIG3 part is received.

Figure 14G:
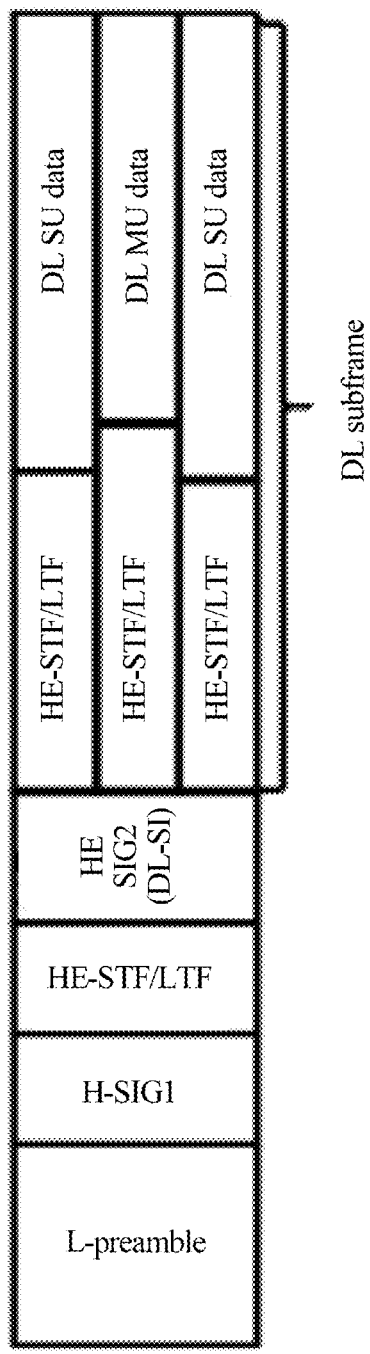

A frame shown in FIG. 14g is a special case of the frame in FIG. 14a, that is, a condition with only the DL subframe but without the UL subframe. The AP sends, in the HE-SIG2, the SI of the STA in the DL subframe. If the STA detects control information of the STA in the DL-SI in the HE-SIG2, in the subsequent DL subframe, the STA needs to receive the data according to the scheduling information indicated by the AP. The DL subframe sent by the AP does not include a SIG field used for additionally transferring the DL SI.

More specifically, for the working principle described in FIG. 13, when the frame shown in FIG. 14g is used, in the STA-specific HE-preamble of the downlink AP transmit end, the HE-SIG3 part is not sent, and in the STA-specific HE-preamble of the downlink STA receive end, the HE-SIG3 part is not received. Because there is no uplink data, a sending module of an uplink STA end and a receiving module of an uplink AP end may be closed.

Figure 14H:
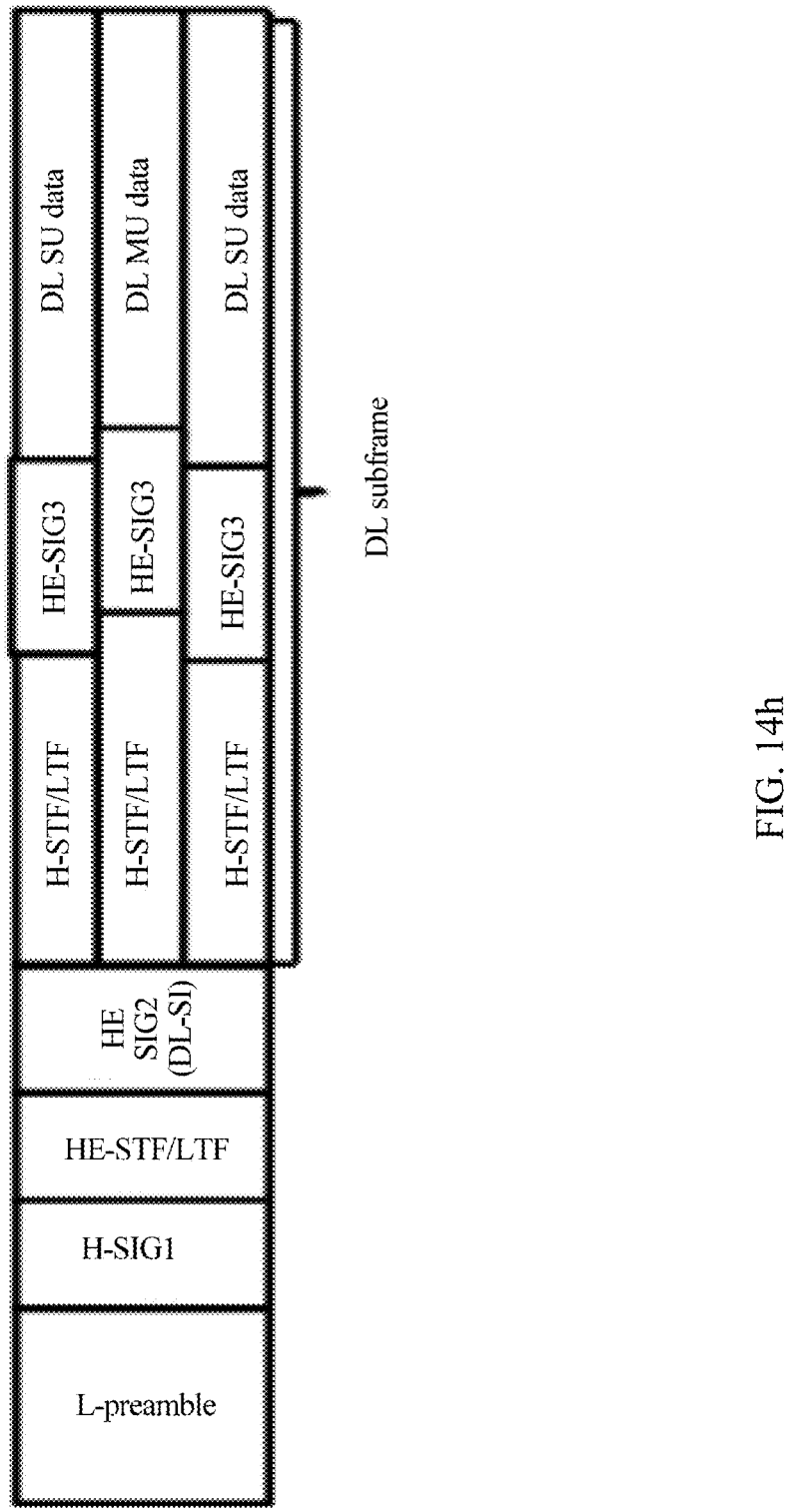

In a frame shown in FIG. 14h, the HE-SIG2 sent by the AP includes partial SI of the STA in the DL subframe, and in the HE-SIG3 in the DL subframe, the remaining DL SI is included. Different from FIG. 14g, a DL STA indicated in the HE-SIG2 continues to detect, in the SIG field (HE-SIG3) of the DL subframe, the remaining DL SI, which may reduce the overhead of the common control information field (HE-SIG2). For example, the AP indicates, in the HE-SIG2, the ID of the DL STA and position information of the assigned resource, and specifically sends, in the HE-SIG3, the STA-specific control information, such as the MCS, the data length, and the spatial stream. The HE-SIG3 may use the LTFs based on frequency multiplexing and spatial multiplexing to obtain the control information of different users/streams, so as to improve the signaling transmission efficiency.

More specifically, for the working principle described in FIG. 13, when the frame shown in FIG. 14h is used, in the STA-specific HE-preamble of the downlink AP transmit end, the HE-SIG3 part is sent, and in the STA-specific HE-preamble of the downlink STA receive end, the HE-SIG3 part is received. Because there is no uplink data, the sending module of the uplink STA end and the receiving module of the uplink AP end are closed.

Figure 14I:
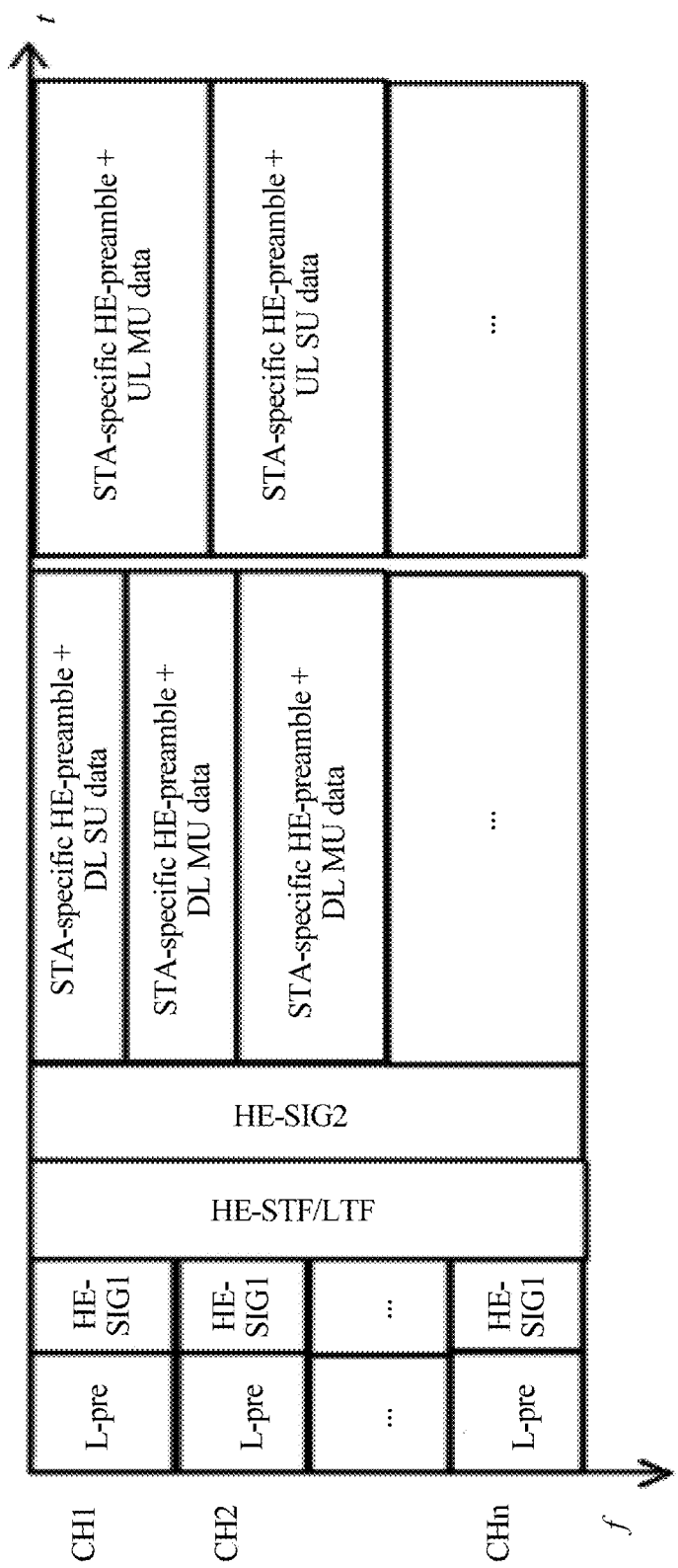

FIG. 14a-h shows examples of the frame format on one channel Channel (for example, 20 MHz); FIG. 14i shows an embodiment of a frame structure in a case in which there are multiple Channels. All the frames in FIGS. 14a-h described above can be sent on the multiple channels. To ensure compatibility with a PPDU frame format of legacy WiFi, the L-preamble and the HE-SIG1 parts herein are preferably copied and sent on each Channel. The HE-SIG1 includes common control information, such as system bandwidth, a quantity of subsequent DL/UL subframes, start time and length information, and if necessary, sending control information of the HE-SIG2. The HE-SIG2 can send, by using bandwidth specified in the HE-SIG1, STA-specific control information.

Uplink and downlink multi-user transmission based on frequency division multiplexing and spatial multiplexing may be supported by using the foregoing frame formats, which may apply to instant access of burst data. The foregoing solution may be directly applied to a WiFi system with backward compatibility. In each implementation manner, efficient indicating of signaling of uplink and downlink multi-user transmission may further be implemented, which reduces signaling overhead and reduces a data detection delay as much as possible.

It should be understood that "one embodiment" or "an embodiment" mentioned throughout the specification refers to a specific feature, structure, or character related to an embodiment is included in at least one embodiment in the present invention. Therefore, "in one embodiment" or "in an embodiment" appeared everywhere in the entire specification may not always refer to a same embodiment. In addition, the specific feature, structure, or character may be combined in one or more embodiments in any suitable manner. Sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiment of the present invention, "B corresponding to A" indicates that B is associated with A and that B may be determined according to A. However, it should also be understood that determining B according to A does not mean determining B according to only A; instead, B may be further determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital STA line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention include a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A station (STA) resource indication method for at least two STAs in a wireless local area network (WLAN) that uses an orthogonal frequency-division multiple access (OFDMA) technology, comprising:
   providing, by an access point (AP) in the WLAN, a frame including a resource indication field to the at least two STAs, wherein:
      the resource indication field is applied to the WLAN; and
      the resource indication field includes: a time-frequency resource indication of one or more of the at least two STAs, an uplink user identifier for one or more users of the time-frequency resource, and a bandwidth of the AP;
   generating, by the AP, scheduling information of the at least two STAs, wherein the scheduling information comprises at least uplink control information used to instruct the at least two STAs to send uplink data; and
   sending, by the AP and respectively on different sub-channels in a specified entire channel, scheduling information corresponding to different STAs, wherein the sending comprises sending the scheduling information using the indicated resource information of the resource indication field.

2. The method according to claim 1, wherein the scheduling information further comprises downlink control information that is used to instruct the at least two STAs to receive downlink data sent by the AP, wherein the downlink control information comprises information, coding formats, data lengths, and spatial streams that are of sub-channels assigned by the AP to the at least two STAs that are allowed to receive the downlink data; and wherein the sending, by the AP, the scheduling information to the at least two STAs comprises:

sending scheduling information comprising the uplink control information and the downlink control information, so that the at least two STAs indicated by the downlink control information receive, on sub-channels that are respectively corresponding to the at least STAs, the downlink data sent by the AP.

3. The method according to claim 1, wherein the scheduling information further comprises first downlink control information and second downlink control information that are used to instruct the at least two STAs to receive the downlink data sent by the AP, wherein the first downlink control information comprises at least the information and the spatial stream of the sub-channel assigned by the AP to the at least two STAs that are allowed to receive the downlink data; the second control information comprises the coding format and the data length of the downlink data sent by the AP; and wherein the sending, by the AP, the scheduling information to the at least two STAs comprises:

sending, by the AP and on the specified channel, the uplink control information and the first downlink control information, so that the STA allowed by the AP to receive the downlink data determines a sub-channel corresponding to the STA; and sending, by the AP and respectively on sub-channels corresponding to the at least two STAs that are allowed to receive the downlink data, the second control information, so that the STA receives, according to the second control information, the downlink data on the sub-channel corresponding to the STA.

4. The method according to claim 1, wherein the sending, by the AP, the scheduling information to the at least two STAs comprises:

sending, by the AP, on the specified channel and in a multicast manner, the scheduling information to the at least two STAs indicated by the scheduling information;

or sending, by the AP, on the specified channel and in a broadcast manner, the scheduling information to the at least two STAs indicated by the scheduling information.

5. The method according to claim 1, further comprising providing a frame number in which the resource indication field is located.

6. A data sending method in a wireless local area network (WLAN) that uses an orthogonal frequency-division multiple access (OFDMA) technology, comprising:

receiving, by a station (STA) in the WLAN:

a frame sent by an access point (AP) of the WLAN, wherein the frame includes a resource indication field, and wherein:

the resource indication field is applied to the WLAN; and the resource indication field includes: a time-frequency resource indication of the STA, an uplink user identifier for one or more users of the time-frequency resource, and a bandwidth of the AP;

scheduling information sent by the AP on a sub-channel, wherein the scheduling information comprises at least uplink control information used to instruct the STA and at least one another STA to send uplink data, and wherein the scheduling information is sent by the AP to the STA using the indicated resource information of the resource indication field; and sending, by the STA, the uplink data according to the uplink control information.

7. The method according to claim 6, wherein the receiving, by the STA, the scheduling information sent by the AP, further comprises:

receiving, by the STA and on the specified channel, the uplink control information and downlink control information that is sent by the AP and that is used to instruct the STA and the at least one another STA to receive downlink data, wherein the downlink control information comprises information, coding formats, data lengths, and spatial streams that are of sub-channels assigned by the AP to at least two STAs that receive the downlink data and that are of the STA and the at least one another STA; and the method further comprises:

receiving, by the STA according to the downlink control information, downlink data sent by the AP.

8. The method according to claim 6, wherein the scheduling information further comprises first downlink control information and second downlink control information that are used to instruct the at least two STAs to receive the downlink data sent by the AP, wherein the first downlink control information comprises at least the information and the spatial streams of the sub-channels assigned by the AP to the at least two STAs that are allowed to receive downlink data; the second downlink control information comprises information about a coding format and a length of the downlink data sent by the AP; and wherein the receiving, by the STA, the scheduling information sent by the AP comprises:

receiving, by the STA and on the specified channel, the uplink control information and the first downlink control information, so that the STA determines a sub-channel corresponding to the STA; and receiving, by the STA and on the sub-channel corresponding to the STA, the second downlink control information sent by the AP, and receiving, on the sub-channel corresponding to the STA, the downlink data according to the second downlink control information.

9. The method according to claim 6, wherein the sending, by the STA, the uplink data according to the uplink control information comprises:

generating, by the STA, second detection reference information according to the uplink control information sent by the AP, and sending, on a sub-channel corresponding to the STA, the second detection reference information to the AP; and transmitting, by the STA and on the sub-channel corresponding to the STA, the uplink data according to the uplink control information, so that the AP receives the uplink data according to the second detection reference information.

10. The method according to claim 6, further comprising receiving a frame number in which the resource indication field is located.

11. A station (STA) resource indication processing apparatus, which is applied to a wireless local area network (WLAN) that uses an orthogonal frequency-division multiple access (OFDMA) technology, wherein the apparatus comprises:

a processor; and an interface, wherein the processor is configured to:

provide a frame including a resource indication field to at least two STAs of the WLAN, wherein:

the resource indication field is applied to the WLAN; and the resource indication field includes: a time-frequency resource indication of one or more of the two STAs, an uplink user identifier for one or more users of the time-frequency resource, and a bandwidth of the AP;

generate scheduling information of the at least two STAs, wherein the scheduling information comprises at least uplink control information used to instruct the at least two STAs to send uplink data, wherein the interface is configured to send the scheduling information corresponding to different STAs respectively on different sub channels in a specified entire channel, and wherein the scheduling information is sent by the interface to the different STAs using the indicated resource information of the resource indication field.

12. The apparatus according to claim 11, wherein the scheduling information further comprises downlink control information that is used to instruct the at least two STAs to receive downlink data sent by an AP, wherein the downlink control information comprises information, coding formats, data lengths, and spatial streams that are of sub-channels assigned by the AP to the at least two STAs that are allowed to receive the downlink data.

13. An access point in a wireless local area network, comprising the resource indication processing apparatus according to claim 11.

14. The apparatus according to claim 11, wherein the processor is further configured to provide a frame number in which the resource indication field is located.

15. A station (STA) resource indication processing apparatus, which is applied to a wireless local area network (WLAN) that uses an orthogonal frequency-division multiple access (OFDMA) technology, wherein the apparatus comprises:

a processor; and
an interface,
wherein the interface is configured to:
    receive a frame sent by an access point (AP) of the WLAN, wherein the frame includes a resource indication field, and wherein:
        the resource indication field is applied to the WLAN; and
        the resource indication field includes: a time-frequency resource indication of a station (STA) of the WLAN, an uplink user identifier for one or more users of the time-frequency resource, and a bandwidth of the AP;
    receive scheduling information sent by the AP on a sub-channel, wherein the scheduling information comprises uplink control information used to instruct the STA and at least one another STA to send uplink data, and wherein the scheduling information is sent by the AP using the indicated resource information of the resource indication field; and
    send the uplink data to the STA according to the uplink control information.

16. A station, comprising the resource indication processing apparatus according to claim 15.

17. The apparatus according to claim 15, wherein the interface is further configured to receive a frame number in which the resource indication field is located.

* * * * *